US011861081B2

(12) United States Patent
Park et al.

(10) Patent No.: US 11,861,081 B2
(45) Date of Patent: Jan. 2, 2024

(54) STYLUS PEN, ELECTRONIC DEVICE FOR RECOGNIZING STYLUS PEN, AND METHOD FOR OPERATING SAME

(71) Applicant: Samsung Electronics Co., Ltd., Gyeonggi-do (KR)

(72) Inventors: Changbyung Park, Gyeonggi-do (KR); Byunghoon Kang, Gyeonggi-do (KR); Joohoon Lee, Gyeonggi-do (KR); Hyunsuk Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 84 days.

(21) Appl. No.: 17/592,820

(22) Filed: Feb. 4, 2022

(65) Prior Publication Data
US 2022/0155878 A1    May 19, 2022

Related U.S. Application Data

(63) Continuation of application No. PCT/KR2020/010417, filed on Aug. 6, 2020.

(30) Foreign Application Priority Data

Aug. 6, 2019   (KR) .................. 10-2019-0095284

(51) Int. Cl.
*G06F 3/038*   (2013.01)
*H02J 50/12*   (2016.01)
(Continued)

(52) U.S. Cl.
CPC ................ *G06F 3/038* (2013.01); *G06F 1/24* (2013.01); *G06F 3/03545* (2013.01);
(Continued)

(58) Field of Classification Search
CPC ............ G06F 3/03545; G06F 3/04162; G06F 3/0383; G06F 3/0442; G06F 3/0441;
(Continued)

(56) References Cited

U.S. PATENT DOCUMENTS

| 2012/0331546 A1 | 12/2012 | Falkenburg et al. |
| 2014/0029183 A1* | 1/2014 | Ashcraft ................. H02J 50/10 361/679.02 |

(Continued)

FOREIGN PATENT DOCUMENTS

| KR | 10-2014-0046327 A | 4/2014 |
| KR | 10-2018-0014461 A | 2/2018 |

(Continued)

*Primary Examiner* — Sanjiv D. Patel
(74) *Attorney, Agent, or Firm* — Cha & Reiter, LLC

(57) ABSTRACT

An electronic device according to various embodiments may comprise: a panel configured to identify the position of a stylus pen; a communication module configured to transmit/receive a communication signal with the stylus pen; at least one containing space coil disposed in a position corresponding to the position of a containing space capable of containing the stylus pen; and at least one processor. The at least one processor may be configured to control the communication module so as to apply, according to a first communication scheme, a signal having a pattern for controlling the stylus pen to the containing space coil on the basis of confirming that the stylus pen is inserted into the containing space, and to transmit, according to a second communication scheme, a communication signal including information for controlling the stylus pen to the stylus pen on the basis of confirming that the stylus pen is removed from the containing space. Various other embodiments are possible.

13 Claims, 22 Drawing Sheets

(51) Int. Cl.
 *G06F 1/24* (2006.01)
 *G06F 3/0354* (2013.01)
 *H02J 7/00* (2006.01)

(52) U.S. Cl.
 CPC ............ *H02J 7/0044* (2013.01); *H02J 50/12*
 (2016.02); *G06F 2200/1632* (2013.01)

(58) Field of Classification Search
 CPC ........... G06F 2203/0384; G06F 3/0346; G06F
 3/038; G06F 2200/1632; G06F 3/046;
 G06F 3/041–047; G06F 2203/041–04114;
 G06F 2203/04807; G06F 1/1669; H02J
 7/00; H02J 50/80; H02J 7/0044; H02J
 50/10; H02J 50/12; H02J 7/342; H02J
 2207/20; H02J 7/0068; H04W 52/028
 See application file for complete search history.

(56) References Cited

U.S. PATENT DOCUMENTS

| | | |
|---|---|---|
| 2014/0152576 A1 | 6/2014 | Kim et al. |
| 2014/0313171 A1 | 10/2014 | Hong et al. |
| 2015/0070310 A1 | 3/2015 | Suzuki et al. |
| 2018/0032163 A1 | 2/2018 | Park et al. |
| 2018/0329527 A1* | 11/2018 | Park .................... G06F 3/03545 |
| 2020/0012353 A1 | 1/2020 | Kim et al. |
| 2020/0050338 A1* | 2/2020 | Choi ....................... H02J 50/90 |
| 2020/0110475 A1* | 4/2020 | Files ..................... G06F 1/1656 |

FOREIGN PATENT DOCUMENTS

| | | |
|---|---|---|
| KR | 10-2018-0124398 A | 11/2018 |
| KR | 10-2019-0055588 A | 5/2019 |

\* cited by examiner

STYLUS PEN, ELECTRONIC DEVICE FOR RECOGNIZING STYLUS PEN, AND METHOD FOR OPERATING SAME

CROSS-REFERENCE TO RELATED APPLICATIONS

This application is a continuation of International Application No. PCT/KR2020/010417, filed on Aug. 6, 2020, which claims priority to Korean Patent Application No. 10-2019-0095284, filed on Aug. 6, 2019, in the Korean Intellectual Property Office, the disclosures of which are incorporated by reference herein in their entireties.

BACKGROUND

1. Field

Various embodiments of the present disclosure relate to a stylus pen, an electronic device for recognizing the stylus pen, and a method of operating the same.

2. Description of the Related Art

An electronic device is being developed to receive various inputs from a user through a specified input device (e.g., a stylus pen) connected to the electronic device by wireless communication. The electronic device may identify a position on the electronic device, designated by an input device having a pen function (which may be referred to as a "stylus pen" for convenience of description in the present disclosure), and perform a function corresponding to the identified position The electronic device may detect a magnetic field generated from the stylus pen by electromagnetic resonance (EMR). The electronic device may identify the position of the stylus pen based on the induced electromotive force generated by a magnetic field for each channel.

The stylus pen may be connected to the electronic device through short-range communication (e.g., Bluetooth low energy (BLE)). The stylus pen may, for example, transmit information about a pressed state of a button disposed on a housing of the stylus pen to the electronic device through short-distance communication, and the electronic device may perform a specified operation based on the received information. According to whether the button provided in the stylus pen is pressed, the electronic device may perform a specified operation. The stylus pen may transmit a communication signal including information indicating the pressed state of the button to the electronic device. The stylus pen may include, for example, a Bluetooth low energy (BLE) module and transmit and receive a communication signal to and from the electronic device by using the BLE module.

In addition, the stylus pen may be inserted into a garage of the electronic device and perform various operations in the inserted state. For example, the stylus pen in the garage may be charged with power supplied wirelessly from the electronic device. Alternatively, the stylus pen in the garage may reset a communication module. However, depending on parameters of BLE communication (e.g., a connection interval and/or a slave latency), a processing time may be lengthened, unnecessary power consumption may be caused during the time, and power consumption may occur due to the BLE communication.

In an electronic device and a method of operating the same according to various embodiments, when the stylus pen is inserted, a signal having continuous pulses in a pattern may be transmitted to the stylus pen by using a garage coil for wireless charging. In a stylus pen and a method of operating the same according to various embodiments, when the stylus pen is inserted into an electronic device, a signal having a pattern may be analyzed to identify command information of the electronic device.

SUMMARY

According to various embodiments, an electronic device may include a panel configured to identify a position of a stylus pen, a communication module configured to transmit and receive communication signals to and from the stylus pen, at least one garage coil disposed at a position corresponding to a position of a garage in which the stylus pen is accommodatable, and at least one processor. The at least one processor may be configured to, based on the stylus pen being identified as inserted into the garage, apply, based on a first communication method, a signal having a pattern for controlling the stylus pen to the garage coil, and based on the stylus pen being identified as removed from the garage, control the communication module to transmit, based on a second communication method, a communication signal including information for controlling the stylus pen to the stylus pen.

According to various embodiments, a stylus pen may include a resonant circuit including a coil and at least one capacitor, a communication module, and at least one control circuit, and the at least one control circuit may be configured to perform a first operation corresponding to a result of an analysis of a signal having a pattern output through the resonant circuit, while the stylus pen is located in a garage of an electronic device, and perform a second operation corresponding to information included in a communication signal received through the communication module, while the stylus pen is located outside the garage of the electronic device.

According to various embodiments, a method of operating an electronic device including a panel configured to identify a position of a stylus pen, a communication module configured to transmit and receive communication signals to and from the stylus pen, and at least one garage coil disposed at a position corresponding to a position of a garage in which the stylus pen is accommodatable may include, based on the stylus pen being identified as inserted into the garage, applying, based on a first communication method, a signal having a pattern for controlling the stylus pen to the garage coil, and based on the stylus pen being identified as removed from the garage, controlling the communication module to transmit, based on a second communication method, a communication signal including information for controlling the stylus pen to the stylus pen.

According to various embodiments, an electronic device and a method of operating the same may be provided, in which when a stylus pen is inserted, a signal having a pattern may be transmitted to the stylus pen by using a garage coil for wireless charging. According to various embodiments, a stylus pen and a method of operating the same may be provided, in which when the stylus pen is inserted into an electronic device, a signal having a pattern may be analyzed to identify command information of the electronic device.

DETAILED DESCRIPTION

Figure 1:
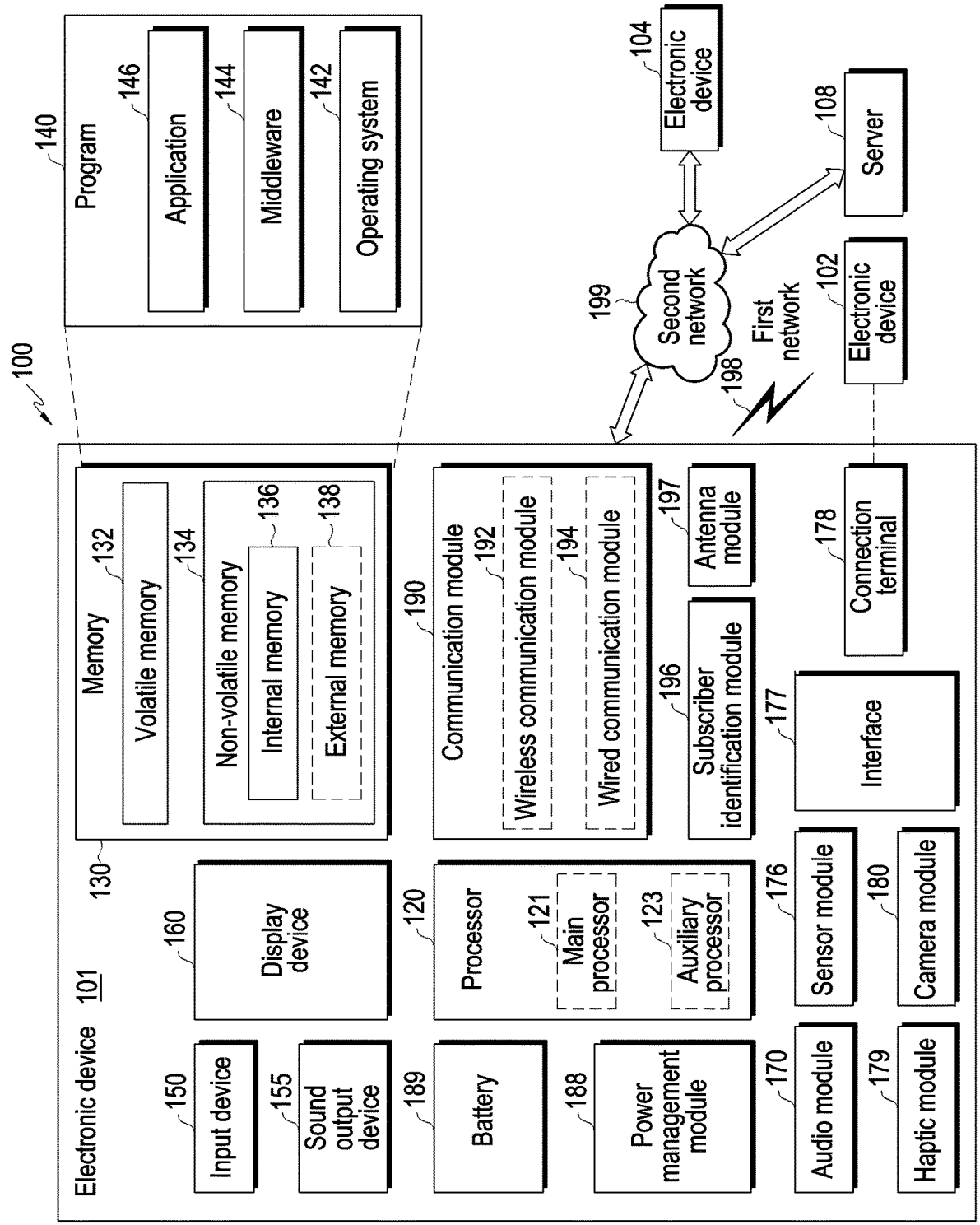
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
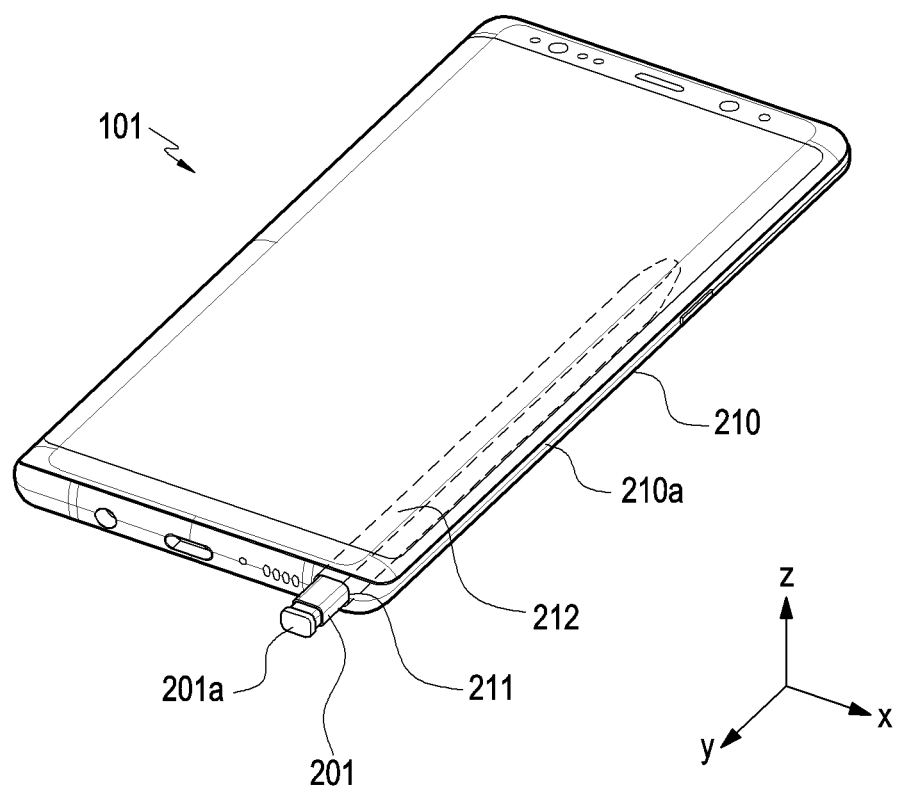
FIG. 2 is a perspective view illustrating an electronic device including a stylus pen according to various embodiments.

FIG. 2 is a perspective view illustrating the electronic device 101 including a stylus pen 201 (e.g., the electronic device 102 of FIG. 1) according to various embodiments. According to various embodiments, the stylus pen 201 in this specification may correspond to the input device 150 of FIG. 1 instead of the electronic device 102 of FIG. 1.

Referring to FIG. 2, the electronic device 101 according to various embodiments may include the configuration illustrated in FIG. 1, and may include a structure into which the stylus pen 201 may be inserted. The electronic device 101 may include a housing 210 and a hole 211 in a portion of the housing 210, for example, a portion of a side surface 210a of the housing 210. The electronic device 101 may include a first internal space 212 that is a garage connected to the hole 211, and the stylus pen 201 may be inserted into the first internal space 212. According to the illustrated embodiment, the stylus pen 201 may include a first button 201a on one end thereof, which may be pressed so that the stylus pen 201 is easily taken out of the first internal space 212 of the electronic device 101. When the first button 201a is pressed, a repulsion mechanism configured in association with the first button 201a (e.g., a repulsion mechanism by at least one elastic member (e.g., a spring)) may operate, so that the stylus pen 201 may be removed from the first internal space 212.

Figure 3A:
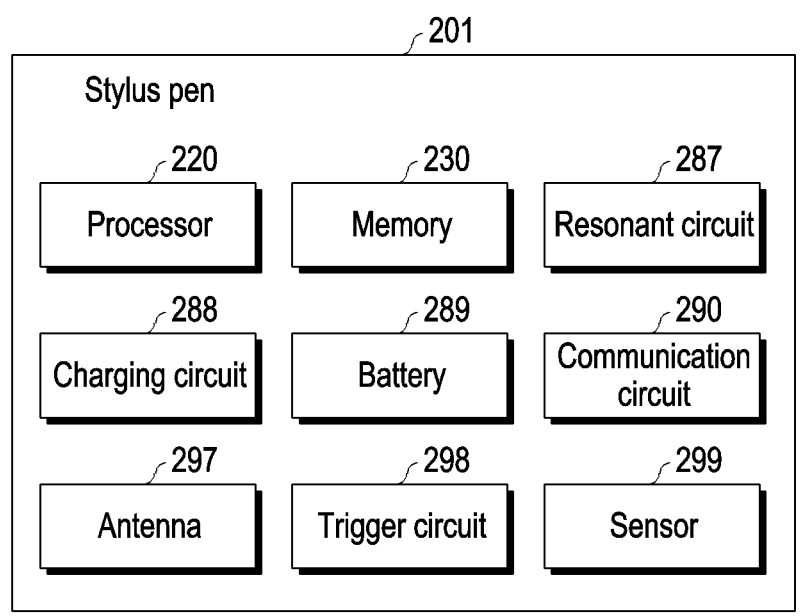
FIG. 3A is a block diagram illustrating a stylus pen according to various embodiments.

FIG. 3A is a block diagram illustrating a stylus pen (e.g., the stylus pen 201 of FIG. 2) according to various embodiments.

Referring to FIG. 3A, the stylus pen 201 according to an embodiment may include a processor 220, a memory 230, a resonant circuit 287, a charging circuit 288, a battery 289, and a communication circuit 290, an antenna 297, a trigger circuit 298, and/or a sensor 299. In some embodiments, the processor 220 of the stylus pen 201, at least a part of the resonant circuit 287, and/or at least a part of the communication circuit 290 may be configured on a printed circuit board or in the form of a chip. The processor 220, the resonant circuit 287, and/or the communication circuit 290 may be electrically coupled to the memory 230, the charging circuit 288, the battery 289, the antenna 297, the trigger circuit 298, and/or the sensor 299.

The processor 220 according to various embodiments may include a customized hardware module or a generic processor configured to execute software (e.g., an application program). The processor 220 may include a component (function) or a software element (program) including at least one of various sensors, a data measurement module, an input/output interface, a module for managing the state or environment of the stylus pen 201, or a communication module, which is provided in the stylus pen 201. The processor 220 may include, for example, one or a combination of two or more of hardware, software, and firmware. According to an embodiment, the processor 220 may be configured to transmit information indicating a pressed state of a button (e.g., a button 337), sensing information obtained by the sensor 299, and/or information calculated based on the sensing information (e.g., information related to the position of the stylus pen 201) to the electronic device 101 through the communication circuit 290.

The resonant circuit 287 according to various embodiments may resonate based on an electromagnetic field signal generated from a digitizer (e.g., the display device 160) of the electronic device 101, and radiate an electromagnetic resonance (EMR) input signal (or magnetic field) by resonance. The electronic device 101 may identify the position of the stylus pen 201 on the electronic device 101 by using the EMR input signal. For example, the electronic device 101 may identify the position of the stylus pen 201 based on the magnitude of an induced electromotive force (e.g., output current) generated by an EMR signal in each of a plurality of channels (e.g., a plurality of loop coils). While the electronic device 101 and the stylus pen 201 have been described as operating by EMR, this is merely exemplary, and the electronic device 101 may generate a signal based on an electric field by electrically coupled resonance (ECR). The resonant circuit of the stylus pen 201 may resonate by an electric field. The electronic device 101 may identify a potential in a plurality of channels (e.g., electrodes) by the resonance in the stylus pen 201 and identify the position of the stylus pen 201 based on the potential. A person skilled in the art will understand that the stylus pen 201 may be implemented in an active electrostatic (AES) method, and the type of implementation is not limited. In addition, the electronic device 101 may detect the stylus pen 201 based on a change in capacitance (self-capacitance or mutual capacitance) associated with at least one electrode of a touch panel. In this case, the stylus pen 201 may not include the resonant circuit. In the present disclosure, "panel" or "sensing panel" may be used as a term encompassing a digitizer and a touch screen panel (TSP).

According to various embodiments, a signal having a pattern may be received through the resonant circuit 287. The processor 220 may analyze the pattern of the signal received through the resonant circuit 287 and perform an operation based on the analysis result. The stylus pen 201 according to various embodiments may perform first communication through the resonant circuit 287 and second communication through the communication circuit 290. For example, when the stylus pen 201 is inserted into the electronic device 101, the stylus pen 201 may receive information from the electronic device 101 through the resonant circuit 287. For example, although the stylus pen 201 may receive a communication signal through the communication circuit 290, when it is detached from the electronic device 101, the stylus pen 201 may also receive a communication signal through the communication circuit 290 even when it is inserted. The two different communications described above will be described later with reference to FIG. 8A.

The memory 230 according to various embodiments may store information related to the operation of the stylus pen 201. For example, the information may include information for communication with the electronic device 101 and frequency information related to an input operation of the stylus pen 201. In addition, the memory 230 may store a program (or application, algorithm, or processing loop) for calculating information about the position of the stylus pen 201 from sensing data of the sensor 299. The memory 230 may store a communication stack of the communication circuit 290. Depending on the implementation, the communication circuit 290 and/or the processor 220 may include a dedicated memory.

The resonant circuit 287 according to various embodiments may include a coil (or inductor) and/or a capacitor. The resonant circuit 287 may resonate based on an input electric field and/or magnetic field (e.g., an electric field and/or magnetic field generated by a digitizer of the electronic device 101). When the stylus pen 201 transmits a signal by EMR, the stylus pen 201 may generate a signal including a resonance frequency based on an electromagnetic field generated from an inductive panel of the electronic device 101. When the stylus pen 201 transmits a signal by AES, the stylus pen 201 may generate a signal through capacitive coupling with the electronic device 101. When the stylus pen 201 transmits a signal by ECR, the stylus pen 201 generates a signal including a resonance frequency based on an electric field generated from a capacitive device of the electronic device. According to an embodiment, the resonant circuit 287 may be used to change the strength or frequency of the electromagnetic field according to a user's manipulation state. For example, the resonant circuit 287 may provide various frequencies for recognizing a hovering input, a drawing input, a button input, or an erasing input. For example, the resonant circuit 287 may provide various resonance frequencies according to a connection combination of a plurality of capacitors, or may provide various resonance frequencies based on a variable inductor and/or a variable capacitor.

When the charging circuit 288 according to various embodiments is connected to the resonant circuit 287 based on a switching circuit, the charging circuit 288 may rectify a resonance signal generated in the resonant circuit 287 into a direct current (DC) signal and provide the DC signal to the battery 289. According to an embodiment, the stylus pen 201 may identify whether the stylus pen 201 is inserted into the electronic device 101 by using the voltage level of the DC signal detected by the charging circuit 288. Alternatively, the stylus pen 201 may identify whether the stylus pen 201 is inserted by identifying a pattern corresponding to the signal identified by the charging circuit 288.

The battery 289 according to various embodiments may be configured to store power required for the operation of the stylus pen 201. The battery 289 may include, for example, a lithium-ion battery or a capacitor, and may be rechargeable or replaceable. According to an embodiment, the battery 289 may be charged with power (e.g., a DC signal (DC power)) supplied from the charging circuit 288.

The communication circuit 290 according to various embodiments may be configured to perform a wireless communication function between the stylus pen 201 and the communication module 190 of the electronic device 101. According to an embodiment, the communication circuit 290 may transmit state information, input information, and/or information related to the position of the stylus pen 201 to the electronic device 101 by short-range communication. For example, the communication circuit 290 may transmit direction information (e.g., motion sensor data) about the stylus pen 201, obtained through the trigger circuit 298, voice information input through a microphone, or information about the remaining amount of the battery 289 to the electronic device 101. For example, the communication circuit 290 may transmit sensing data obtained from the sensor 299 and/or information related to the position of the stylus pen 201 identified based on the sensing data to the electronic device 101. For example, the communication circuit 290 may transmit information about a state of a button (e.g., the button 337) included in the stylus pen 201 to the electronic device 101. For example, the short-range communication scheme may include, but not limited to, at least one of Bluetooth, Bluetooth low energy (BLE), NFC, or Wi-Fi direct.

The antenna 297 according to various embodiments may be used to transmit or receive a signal or power to or from the outside (e.g., the electronic device 101). According to an embodiment, the stylus pen 201 may include a plurality of antennas 297 and select at least one of the antennas 297, suitable for a communication scheme. The communication circuit 290 may exchange signals or power with an external electronic device through the selected at least one antenna 297.

The trigger circuit 298 according to various embodiments may include at least one button or a sensor circuit. According to an embodiment, the processor 220 may identify an input scheme (e.g., touch or press) or type (e.g., EMR button or BLE button) of the button in the stylus pen 201. According to an embodiment, the trigger circuit 298 may transmit a trigger signal to the electronic device 101 by using an input signal of a button or a signal through the sensor 299.

The sensor 299 according to various embodiments may include an accelerometer, a gyro sensor, and/or a geomagnetic sensor. The accelerometer may sense information about a linear motion of the stylus pen 201 and/or a 3-axis acceleration of the stylus pen 201. The gyro sensor may sense information related to rotation of the stylus pen 201. The geomagnetic sensor may sense information about a direction in which the stylus pen 201 is directed in an absolute coordinate system. According to an embodiment, the sensor 299 may include a sensor for measuring movement, and a sensor for generating an electrical signal or data value corresponding to an internal operating state or external environmental state of the stylus pen 201, for example, at least one of a remaining battery level sensor, a pressure sensor, an optical sensor, a temperature sensor, or a biometric sensor. According to various embodiments, the processor 220 may transmit the information obtained from the sensor 299 to the electronic device 101 through the communication circuit 290. Alternatively, the processor 220 may transmit information related to the position of the stylus pen 201 (e.g., coordinates of the stylus pen 201) and/or displacement of the stylus pen 201) based on the information obtained from the sensor 299 to the electronic device 101 through the communication circuit 290.

Figure 3B:
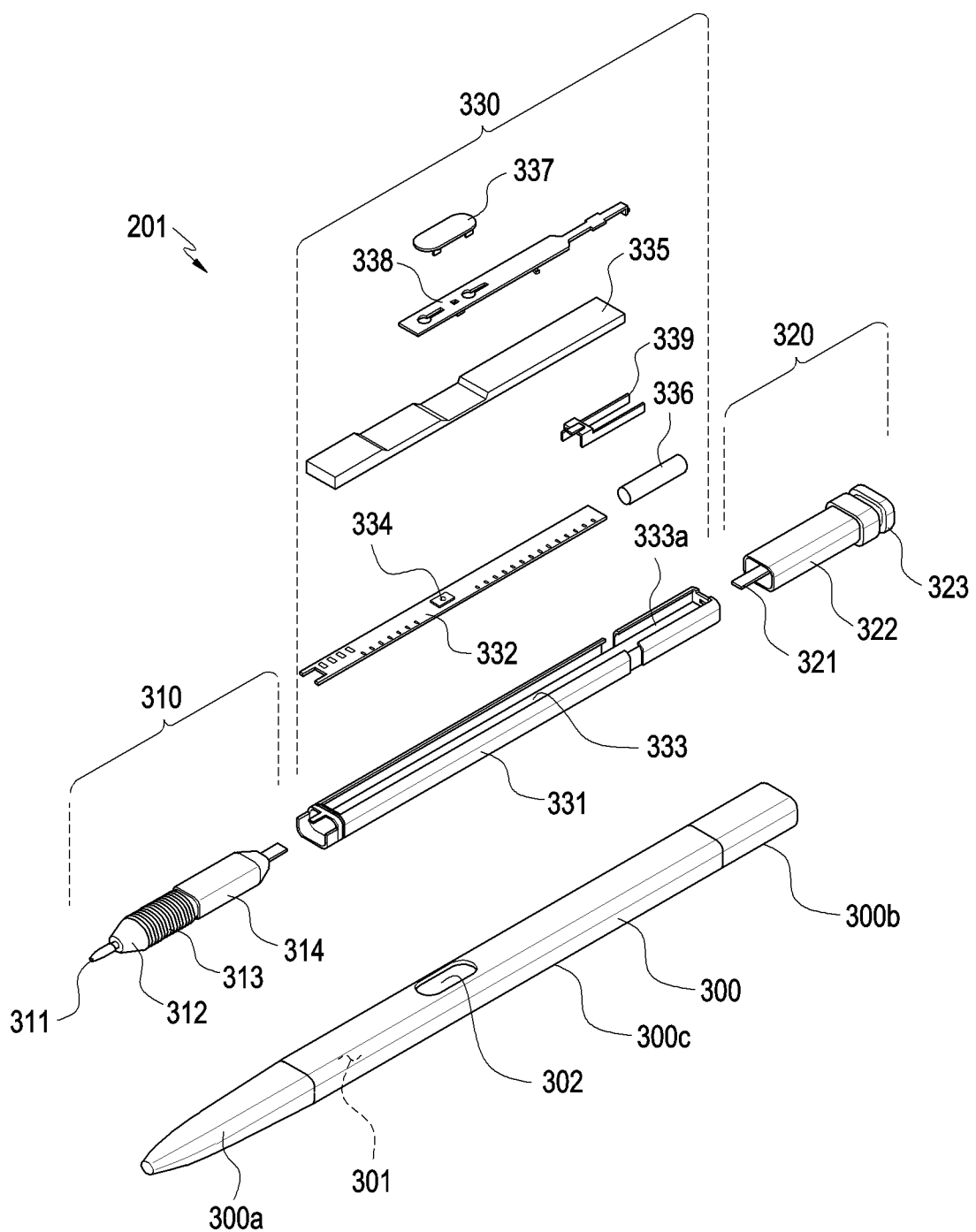
FIG. 3B is an exploded perspective view illustrating a stylus pen according to various embodiments.

FIG. 3B is an exploded perspective view illustrating a stylus pen (e.g., the stylus pen 201 of FIG. 2), according to various embodiments.

Referring to FIG. 3B, the stylus pen 201 may include a pen housing 300 forming the exterior of the stylus pen 201 and an inner assembly inside the pen housing 300. In the illustrated embodiment, the inner assembly with several components of the stylus pen 201 coupled together therein may be inserted into the pen housing 300 by one assembly action.

The pen housing 300 may be elongated between a first end 300a and a second end 300b and include a second internal space 301 therein. The pen housing 300 may have an elliptical cross section with a major axis and a minor axis, and may be shaped into an elliptical cylinder as a whole. The first internal space 212 of the electronic device 101 described before with reference to FIG. 2 may also have an elliptical cross-section corresponding to the shape of the pen housing 300. According to various embodiments, at least a portion of the pen housing 300 may include a synthetic resin (e.g., plastic) and/or a metallic material (e.g., aluminum). According to an embodiment, the first end 300a of the pen housing 300 may be formed of a synthetic resin. Various other embodiments may be available for the material of the pen housing 300.

The inner assembly may be elongated in correspondence with the shape of the pen housing 300. The inner assembly may be largely divided into three parts along the longitudinal direction. For example, the inner assembly may include a coil unit 310 disposed at a position corresponding to the first end 300a of the pen housing 300, an ejection member 320 disposed at a position corresponding to the second end 300b of the pen housing 300, and a circuit board unit 330 disposed at a position corresponding to a body of the pen housing 300.

The coil unit 310 may include a pen tip 311 exposed to the outside of the first end 300a, when the inner assembly is completely inserted into the pen housing 300, a packing ring 312, and a coil 313 wound a plurality of times, and/or a pen pressure sensing unit 314 for obtaining a change in pressure applied by the pressing of the pen tip 311. The packing ring 312 may include epoxy, rubber, urethane, or silicone. The packing ring 312 may be provided for the purpose of waterproofing and dustproofing and protect the coil unit 310 and the circuit board unit 330 from water or dust. According to an embodiment, the coil 313 may form a resonance frequency in a set frequency band (e.g., 500 kHz and adjust the resonance frequency formed by the coil 313 in a certain range, in combination with at least one element (e.g., a capacitor).

The ejection member 320 may include a configuration for withdrawing the stylus pen 201 from the first internal space 212 of the electronic device (e.g., 101 of FIG. 2). According to an embodiment, the ejection member 320 may be include a shaft 321, an ejection member 322 disposed around the shaft 321 and forming the whole exterior of the ejection member 320, and a button portion 323 (e.g., the first button 201a of FIG. 2). When the inner assembly is completely inserted into the pen housing 300, a part including the shaft 321 and the ejection body 322 may be surrounded by the second end 300b of the pen housing 300, and at least a portion of the button portion 323 may be exposed outward from the second end 300b. A plurality of components which are not shown, for example, cam members or elastic members may be disposed in the ejection body 322 to form a push-pull structure. In an embodiment, the button portion 323 may be substantially coupled with the shaft 321 to make a linear reciprocating motion with respect to the ejection body 322. According to various embodiments, the button portion 323 may include a button having a locking structure so that a user may take out the stylus pen 201 by using a fingernail. According to an embodiment, the stylus pen 201 may provide another input method by including a sensor for detecting a linear reciprocating motion of the shaft 321.

The circuit board unit 330 may include a printed circuit board 332, a base 331 surrounding at least one surface of the printed circuit board 332, and an antenna. According to an embodiment, a board mounting portion 333 on which the printed circuit board 332 is disposed may be formed on the top surface of the base 331, and the printed circuit board 332 may be fixedly mounted on the board mounting portion 333. According to an embodiment, the printed circuit board 332 may include a first surface and a second surface, and a variable capacitor or switch 334 connected to the coil 313 may be disposed on the first surface, and, a charging circuit, a battery 336 or a communication circuit may be disposed on the second surface. The first surface and the second surface of the printed circuit board 332 may refer to different stacked surfaces in a top/down stack structure according to an embodiment, and refer to different portions of the printed circuit board 332 disposed along the longitudinal direction according to another embodiment. The battery 336 may include an electric double layered capacitor (EDLC). The charging circuit may be located between the coil 313 and the battery and include a voltage detector circuitry and a rectifier. The battery 336 may not necessarily be disposed on the second surface of the printed circuit board 332. The position of the battery 336 may vary according to various mounting structures of the circuit board 330, and the battery 336 may be disposed at a position different from that shown in the drawing.

The antenna may include an antenna embedded in an antenna structure 339 and/or the printed circuit board 332, as in the example illustrated in FIG. 3B. According to various embodiments, a switch 334 may be provided on the printed circuit board 332. The second button 337 provided in the stylus pen 201 may be used to press the switch 334 and exposed outward through a side opening 302 of the pen housing 300. While supporting the second button 337, a support member 338 may restore or maintain the second button 337 to or at a certain position by providing an elastic restoring force in the absence of an external force applied to the second button 337. The second button 337 may be implemented as a physical key, a touch key, a motion key, or a pressure key, or implemented in a keyless manner. The implementation type of the button is not limited.

The circuit board unit 330 may include, for example, a packing ring such as an O-ring. According to an embodiment, O-rings formed an elastic material may be disposed at both ends of the base 331 to form a sealing structure between the base 331 and the pen housing 300. In some embodiments, the support member 338 may partially adhere to the inner wall of the pen housing 300 around the side opening 302 to form a sealing structure. For example, at least one portion of the circuit board unit 330 may include a waterproof and dustproof structure similar to the packing ring 312 of the coil unit 310.

The stylus pen 201 may include a battery mounting portion 333a in which the battery 336 is disposed, on the top surface of the base 331. The battery 336 that may be mounted on the battery mounting portion 333a may include, for example, a cylinder-type battery.

The stylus pen 201 may include a microphone (not shown) and/or a speaker. The microphone and/or the speaker may be directly coupled to the printed circuit board 332 or coupled to a separate flexible printed circuit board (FPCB) (not shown) coupled to the printed circuit board 332. According to various embodiments, the microphone and/or the speaker may be disposed at a position parallel to the second button 337 in the longitudinal direction of the stylus pen 301.

Figure 4:
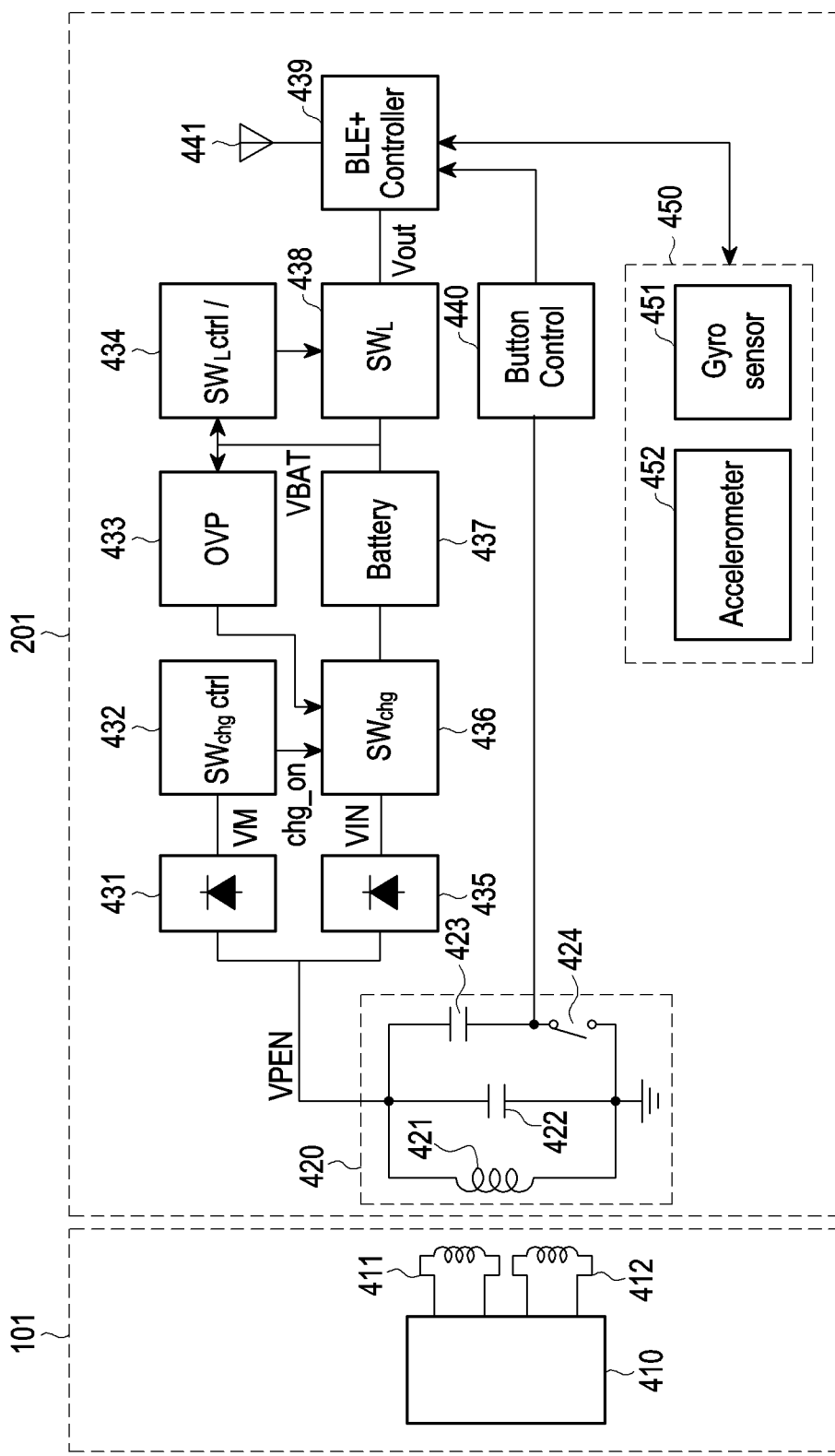
FIG. 4 is a diagram illustrating the configurations of an electronic device and a stylus pen according to various embodiments.

FIG. 4 is a diagram illustrating configurations of an electronic device and a stylus pen according to various embodiments.

According to various embodiments, the electronic device 101 (e.g., the electronic device 101 of FIG. 1) may include a pen controller 410. The pen controller 410 may include at least one coil 411 and 412 and supply charging power to the stylus pen 201 (e.g., the stylus pen 201 of FIG. 2) through the at least one coil 411 and 412. The at least one coil 411 and 412 may be disposed at, not limited to, a position physically adjacent to a coil 421 of the stylus pen 201, when the stylus pen 201 is inserted into the garage of the electronic device 101. Insertion into the garage is merely exemplary, and the electronic device 101 may include an area (or space) in which the stylus pen 201 may be mounted (or attached), aside from the garage. In this case, the stylus pen 201 may be detachably attached in the area (or space). Those skilled in the art will understand that the operation of the stylus pen 201 in the garage in the present disclosure may also be performed, when the stylus pen 201 is attached to the mounting area (or space) in another embodiment.

At least some functions of the pen controller 410 may be performed by the processor 120, or the pen controller 410 and the processor 120 may be integrated to perform at least some functions. In the present disclosure, when it is said that the pen controller 410 performs a specific operation, this may mean that the specific operation is performed by the processor 120 or by a control circuit independent of the processor 120.

The pen controller 410 may include a control circuit (e.g., the control circuit independent of the processor 120), an inverter, and/or an amplifier, in addition to the at least one coil 411 and 412. As described above, the pen controller 410 may not include the control circuit. In this case, the pen controller 410 may provide a signal for charging to the at least one coil 411 and 412 under the control of the processor 120.

According to various embodiments, the pen controller 410 may provide a signal having a pattern through the at least one coil 411 and 412. The pattern may be pre-shared with the stylus pen 201, for controlling the stylus pen 201 and include, but not limited to, for example, a charging start instruction pattern, a charging termination instruction pattern. While two coils 411 and 412 are shown to providing a charging signal or a signal having a pattern for control, this is merely exemplary, and the number of the coils is not limited.

Table 1 illustrates information about associations among binary codes configured to be transmitted from the pen controller 410 to the stylus pen 201, patterns, and configured control operations according to various embodiments.

TABLE 1

| Binary code | Pattern | Control operation |
|---|---|---|
| 0000 0001 | First pattern | BLE communication module reset |
| 0000 0010 | Second pattern | Charging start |
| 0000 0011 | Third pattern | Indication of garage-in |
| 0000 0100 | Fourth pattern | Sensor reset |

For example, the electronic device 101 may determine to command the reset of a BLE communication module of the stylus pen 201 and identify a binary code "0000 0001" corresponding to the command. The electronic device 101 may apply a signal of the first pattern corresponding to the binary code "0000 0001" to a garage coil (e.g., the coils 411 and 412). An electromagnetic induction signal corresponding to the signal of the first pattern may be output from the coil 421 of the stylus pen 201 through inter-coil electromagnetic induction. The stylus pen 201 may identify the binary code of "0000 0001", for example, based on a rectified voltage (e.g., VM). The stylus pen 201 may reset the BLE communication module corresponding to the binary code of "0000 0001". The electronic device 101 may apply various patterns of signals corresponding to charging start, indication of garage-in, and sensor reset to the garage coil (e.g., the coils 411 and 412). The stylus pen 201 may perform a corresponding operation based on the electromagnetic induction signal (or a signal obtained by rectifying the electromagnetic induction signal). Various patterns corresponding to control operations will be described later. The binary codes, patterns, and control operations in Table 1 are merely exemplary.

According to various embodiments, the stylus pen 201 may generate a signal of a sixth pattern as illustrated in Table 2.

TABLE 2

| Binary code | Pattern | Control operation |
|---|---|---|
| 1000 0011 | Sixth pattern | Indication of garage-in |

The electronic device 101 may identify an induced electromotive force signal by a signal of the sixth pattern and identify a binary code of "1000 0011" based on the induced electromotive force signal. The electronic device 101 may identify that the stylus pen 201 is located in the garage based on the binary code of "1000 0011". The electronic device 101 may operate in an insert mode based on the insertion of the stylus pen 201. For example, the electronic device 101 may release a pen input sensing operation of the sensing panel to reduce current consumption. In various embodiments, the electronic device 101 may detect the insertion of the stylus pen 201 by receiving the signal of the sixth pattern from the stylus pen 201 (e.g., an active electrostatic pen). The electronic device 101 may transmit a communication signal for controlling the stylus pen 201 to operate in the insert mode to the stylus pen 201, for example, by BLE communication.

According to various embodiments, a resonant circuit 420 (e.g., the resonant circuit 287 of FIG. 3A) of the stylus pen 201 may include the coil 421, at least one capacitor 422 and 423, and/or a switch 424. When the switch 424 is in an off state, the coil 421 and the capacitor 422 may form the resonant circuit, and when the switch 424 is in an on state, the coil 421 and the capacitors 422 and 423 may form the resonant circuit. Accordingly, the resonance frequency of the resonant circuit 420 may be changed according to the on/off state of the switch 424. For example, the electronic device 101 may identify the on/off state of the switch 424 based on the frequency of a signal from the stylus pen 201. For example, when the button 337 of the stylus pen 201 is pressed/released, the switch 424 may be turned on/off, and the electronic device 101 may identify whether the button 337 of the stylus pen 201 has been pressed, based on the frequency of the received signal, identified through the digitizer.

According to various embodiments, at least one rectifier 431 and 435 may rectify and output an alternating current (AC) waveform signal VPEN output from the resonant circuit 420. A charging switch controller (SW$_{chg}$ ctrl) 432 may receive the rectified signal VM output from the rectifier 431. Based on the rectified signal VM, the charging switch controller 432 may identify whether a signal generated from the resonant circuit 420 is a signal for charging or a signal for position detection. For example, the charging switch controller 432 may identify whether the signal generated from the resonant circuit 420 is a signal for charging or a signal for position detection based on, for example, the magnitude of the voltage of the rectified signal VM. Alternatively, the charging switch controller 432 may identify whether a signal having the charging start pattern is received based on the waveform of the rectified signal VM.

According to various embodiments, when the signal is identified as for charging, the charging switch controller 432 may control a charging switch (SW$_{chg}$) 436 to the on state. Alternatively, when a signal having the charging start pattern is detected, the charging switch controller 432 may control the charging switch (SW$_{chg}$) 436 to be turned on. The charging switch controller 432 may transmit a charging start signal chg_on to the charging switch 436. In this case, a rectified signal VIN may be transmitted to a battery 437 (e.g., the battery 289 of FIG. 3a) through the charging switch 436. The battery 437 may be charged by using the received rectified signal VIN. An over-voltage protection circuit (OVP) 433 may identify a battery voltage VBAT and control the charging switch 436 to be turned off when the battery voltage exceeds an over-voltage threshold. The charging switch (SW$_{chg}$) 436 may operate like a low dropout (LDO) regulator that adjusts the gate voltage of the charging switch (SW$_{chg}$) 436 so that the battery voltage VBAT may be controlled to a constant voltage.

According to various embodiments, when a charging stop pattern is identified, the charging switch controller 432 may control the charging switch 436 to the off state. According to various embodiments, when a reset pattern is identified, the charging switch controller 432 may transmit a reset signal to a BLE communication circuit and controller (BLE+controller) 439 (e.g., the communication circuit 290 and the processor 220 of FIG. 3a). According to various embodiments, when a pattern indicating a position in the garage is identified, the charging switch controller 432 may transmit corresponding information dck to the BLE communication circuit and controller (BLE+controller) 439 (e.g., the communication circuit 290 and the processor 220 of FIG. 3a).

According to various embodiments, a load switch controller (SW$_L$ ctrl) 434 may control a load switch (SW$_L$) 438 to the on state, when the battery voltage is identified as exceeding an operating voltage threshold. When the load switch 438 is turned on, power from the battery 437 may be transferred to the BLE communication circuit and controller (BLE+controller) 439 (e.g., the communication circuit 290 and processor 220 of FIG. 3a). The BLE communication circuit and controller 439 may operate by using the received power. When the distance between the stylus pen 201 and the electronic device 101 is greater than a threshold distance, a button control circuit (button control) 440 may transmit information about an input of a button (e.g., the button 337) to the BLE communication circuit and controller 439. The BLE communication circuit and controller 439 may transmit the received information about the button input to the electronic device 101 through an antenna 441 (e.g., the antenna 297 of FIG. 3A). A sensor 450 (e.g., the sensor 299 of FIG. 3a) may include a gyro sensor 451 and/or an accelerometer 452. Sensing data obtained by the gyro sensor 451 and/or the accelerometer 452 may be transmitted to the BLE communication circuit and controller 439. The BLE communication circuit and controller 439 may transmit a communication signal including the received sensing data to the electronic device 101 through the antenna 441. Alternatively, the BLE communication circuit and controller 439 may identify information related to the position of the stylus pen 201 (e.g., the coordinates and/or displacement of the stylus pen 201) identified based on the received sensing data. The BLE communication circuit and controller 439 may transmit the identified information related to the position of the stylus pen 201 to the electronic device 101 through the antenna 441. According to various embodiments, when the stylus pen 201 is withdrawn from the electronic device 101, the BLE communication circuit and controller 439 may activate the accelerometer 452. When the button (e.g., button 337) is pressed, the BLE communication circuit and controller 439 may activate the gyro sensor 451. The activation timings are merely an example, and there is no limitation on the activation timing of each sensor. In addition, the sensor 450 may further include a geomagnetic sensor. When only the accelerometer 452 is activated, the stylus pen 201 may provide acceleration information measured by the accelerometer 452 to the electronic device 101, and the electronic device 101 may operate based on both of the position and acceleration information of the stylus pen 201, which have been identified based on a pen signal.

According to various embodiments, the electronic device 101 may control the stylus pen 201 to enter a charge mode through a first communication method (e.g., unidirectional/EMR communication). The stylus pen 201 may transmit charging information (e.g., a battery charge percentage) to the electronic device 101 in a second communication method (e.g., bidirectional/BLE communication). The first communication method may include at least one of ECR, AES, or unidirectional communication, in addition to EMR. The second communication method may include at least one of Bluetooth communication, NFC communication, or Wi-Fi direct, in addition to BLE communication. When the charging information received through BLE communication indicates fully charged (e.g., 100% or full-charge voltage), the electronic device 101 may discontinue the operation of charging the stylus pen 201 and perform auxiliary charging. When the battery charge level of the stylus pen 201 falls to or below a certain level (e.g., 95% or a specific voltage) after the charging of the stylus pen 201 is stopped, the electronic device 101 may control the stylus pen 201 to enter the charge mode through the first communication method, thereby performing charging.

Figure 5:
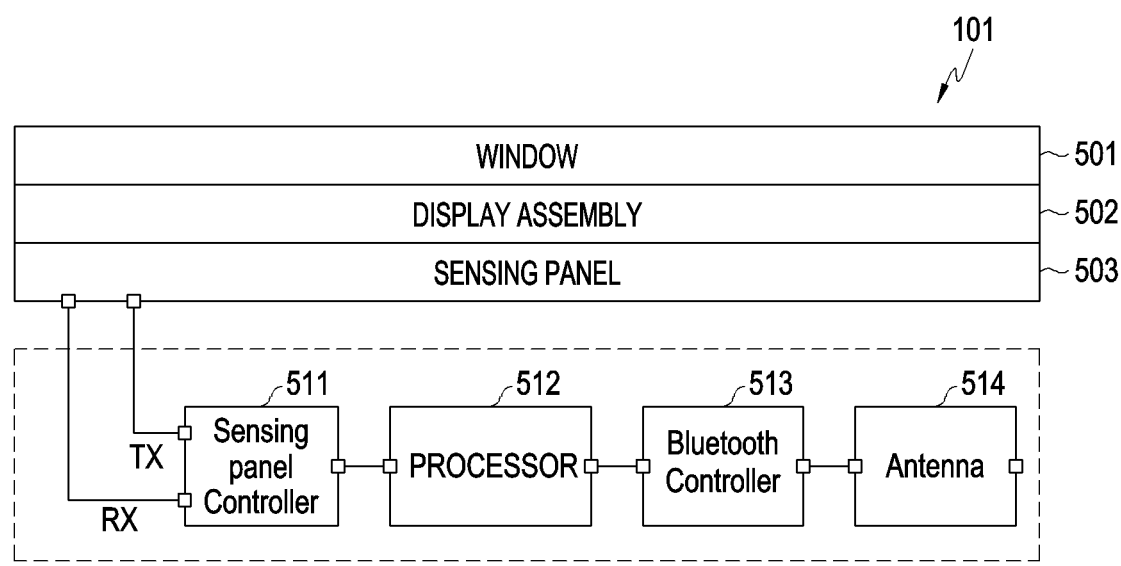
FIG. 5 is a diagram illustrating the configuration of an electronic device according to various embodiments.

FIG. 5 is a diagram illustrating the configuration of an electronic device according to various embodiments.

According to various embodiments, the electronic device 101 (e.g., the electronic device 101 of FIG. 1) may include a sensing panel controller 511, a processor 512 (e.g., the processor 120), a Bluetooth controller 513 (e.g., the communication module 190), and/or an antenna 514. The electronic device 101 may include a sensing panel 503, a display assembly 502 disposed on the sensing panel 503, and/or a window 501 disposed on the display assembly 502. Depending on implementation, when the sensing panel 503 is implemented as a digitizer, a touch screen panel for sensing a user's touch may be further disposed on or under the sensing panel 503. The touch screen panel may be located on the display assembly 502 depending on implementation. As described before, the sensing panel 503 may be implemented as a digitizer and include a plurality of loop coils.

According to various embodiments, when implemented as a digitizer, the sensing panel 503 may include a component (e.g., an amplifier) for applying an electrical signal (e.g., a transmission signal) to the loop coils. The sensing panel 503 may include a component (e.g., an amplifier, a capacitor, or an ADC) for processing a signal (e.g., an input signal) output from the loop coils. The sensing panel 503 may identify the position of the stylus pen 201 based on the magnitudes of signals received from the loop coils (e.g., a converted digital value converted for each channel), and output information about the position to the processor 120. Alternatively, depending on implementation, the processor 120 may identify the position of the stylus pen 201 based on the magnitudes of the signals received from the loop coils (e.g., the converted digital value for each channel). For example, the sensing panel 503 may apply a current to at least one of the loop coils, and the at least one coil may form a magnetic field. The stylus pen 201 may resonate by a magnetic field formed around it, and a magnetic field may be formed from the stylus pen 201 by the resonance. A current may be output from each of the loop coils by the magnetic field formed from the stylus pen 201. The electronic device 101 may identify the position of the stylus pen 201 based on the magnitude of the current (e.g., converted digital value) for each of the channels of the loop coils. To determine the position of the stylus pen 201, the loop coils may include coils extending in one axis (e.g., x-axis) direction and coils extending in another axis (e.g., y-axis) direction. However, the arrangement of the coils is not limited. The sensing panel controller 511 may apply a transmission signal Tx to at least some of the plurality of loop coils of the sensing panel 503, and the loop coil receiving the transmission signal Tx may form a magnetic field. The sensing panel controller 511 may receive reception signals Rx from at least some of the plurality of loop coils in time division. The sensing panel controller 511 may identify the position of the stylus pen 201 (e.g., the stylus pen 201 of FIG. 2) based on the received signals Rx and transmit information about the position of the stylus pen 201 to the processor 512. For example, the strengths of the reception signals Rx may be different for the plurality of respective loop coils (e.g., the respective channels), and the position of the stylus pen 201 may be identified based on the strengths of the reception signals. In addition, the electronic device 101 may identify whether the button (e.g., the button 337) of the stylus pen 201 has been pressed based on the frequency of a received signal. For example, when the frequency of the received signal is a first frequency, the electronic device 101 may identify that the button of the stylus pen 201 has been pressed, and when the frequency of the received signal is a second frequency, the electronic device 110 may identify that the button of the stylus pen 201 is in a released state. Alternatively, when the sensing panel is implemented as a touch screen panel (TSP), the sensing panel 503 may identify the position of the stylus pen 200 based on an output signal of an electrode. The touch screen panel may be located on the display assembly 502. The touch screen panel may be implemented in an in-cell structure in which a sensor electrode is located inside the display assembly 502. Alternatively, the sensor electrode may be implemented as an on-cell structure in which a sensor electrode is located on the display assembly 502. Alternatively, the electronic device 101 may detect the pen based on a change in the capacitance (mutual capacitance and/or self-capacitance) of a touch panel electrode. Hardware for sensing a pen signal from the stylus pen on the digitizer or the touch screen panel may be referred to as the sensing panel 503. When the position of the stylus pen 201 is identified through the touch screen panel, the electronic device 101 may identify whether the button has been pressed based on a received communication signal.

The sensing panel controller 511 may identify whether the stylus pen 201 has been inserted into (or coupled with) the electronic device 101 based on a received signal, and notify the processor 512 of the identification. Depending on implementation, the sensing panel controller 511 may be integrated with the sensing panel 503. In various embodiments, the pen controller 401 of FIG. 4 and the sensing panel controller 510 may be configured into one IC. The processor 512 may transmit a signal for wireless charging based on whether the stylus pen 201 has been inserted. The processor 512 may control the Bluetooth controller 513 based on whether the stylus pen 201 has been inserted. When a wireless communication connection has not been established, the processor 512 may control the Bluetooth controller 513 to establish a wireless communication connection with the stylus pen 201. In addition, when the stylus pen 201 is inserted, charging capacity information may be transmitted to the electronic device 101, and when the stylus pen 201 is removed, information about button press and sensor data may be transmitted to the electronic device 101. In addition, the processor 512 may control transmission of a charging signal and a control signal to the sensing panel controller 511, based on data received from the stylus pen 201. The processor 512 may identify a gesture of the stylus pen 201 based on data received from the stylus pen 201 and perform an operation corresponding to the gesture. The processor 512 may indicate a function mapped to the gesture to an application. The Bluetooth controller 513 may transmit/receive information through the stylus pen 201 and the antenna 514. The display assembly 502 may include a component for displaying a screen. The window 501 may be formed of a transparent material so that at least a portion of the display assembly 502 may be visually exposed.

Figure 6A:
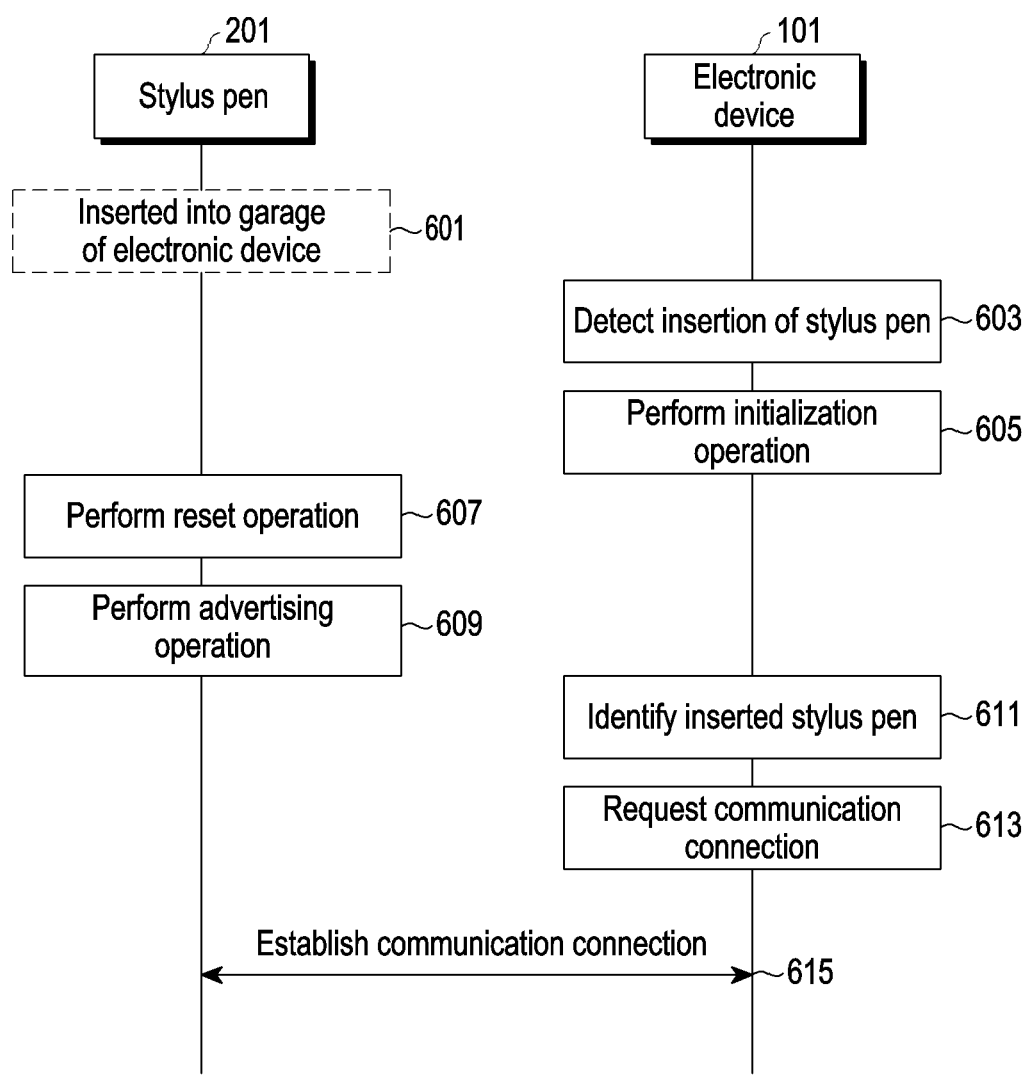
FIG. 6A is a flowchart illustrating operations of a stylus pen and an electronic device, when the stylus pen is inserted into the electronic device according to various embodiments.

FIG. 6A is a flowchart illustrating operations of a stylus pen and an electronic device, when the stylus pen is inserted into the electronic device according to various embodiments.

According to various embodiments, in operation 601, the stylus pen 201 (e.g., the stylus pen 201 of FIG. 2) may be inserted into the garage of the electronic device 101 (e.g., the electronic device 101 of FIG. 1). For example, the user may insert the stylus pen 201 into the garage of the electronic device 101, and the operation is marked with a dotted line based on the fact that the operation is not an active operation of the stylus pen 201. Regarding the embodiment of FIG. 6A, a case in which the stylus pen 201 without a communication connection to the electronic device 101 is inserted into the electronic device 101 is described. In the present disclosure, when the electronic device 101 or the stylus pen 201 performs a specific operation, this may imply that the processor 120 included in the electronic device 101 or the processor 220 included in the stylus pen 201 performs the specific operation. When the electronic device 101 or the stylus pen 201 performs a specific operation, this may imply that the processor 120 included in the electronic device 101 or the processor 220 included in the stylus pen 201 controls other hardware to perform the specific operation. Alternatively, when the electronic device 101 or the stylus pen 201 performs a specific operation, this may imply that an instruction stored in a memory, which causes the processor 120 included in the electronic device 101 or the processor 220 included in the stylus pen 201 to perform the specific operation is executed or the instruction is stored.

According to various embodiments, in operation 603, the electronic device 101 may detect the insertion of the stylus pen 201. For example, the electronic device 101 may detect the insertion of the stylus pen 201 based on a reception signal received from the stylus pen 201 in response to a transmission signal transmitted through the garage coil (e.g., the coils 411 and 412). However, those skilled in the art will understand that the method of detecting the insertion is not limited. In operation 605, the electronic device 101 may perform an initialization operation, for example, transmit a reset command to the stylus pen 201. For example, the electronic device 101 transmits a reset command. When the electronic device 101 identifies insertion of the stylus pen 201 having no connection established, in an idle state, in a stuck state, or having no connection history, the electronic device 101 may transmit the reset command.

According to various embodiments, in operation 607, the stylus pen 201 may perform a reset operation. For example, the stylus pen 201 may release an existing BLE connection and initialize the BLE communication module. In operation 609, the stylus pen 201 may perform an advertising operation. For example, the stylus pen 201 may broadcast an advertisement signal. In operation 611, the electronic device 101 may identify the inserted stylus pen 201. The electronic device 101 may identify the inserted stylus pen 201 based on the received advertisement signal. In operation 613, the electronic device 101 may request a communication connection. For example, the electronic device 101 may transmit a connection request signal corresponding to the advertisement signal. The stylus pen 201 may establish a communication connection with the electronic device 101 in operation 615.

Figure 6B:
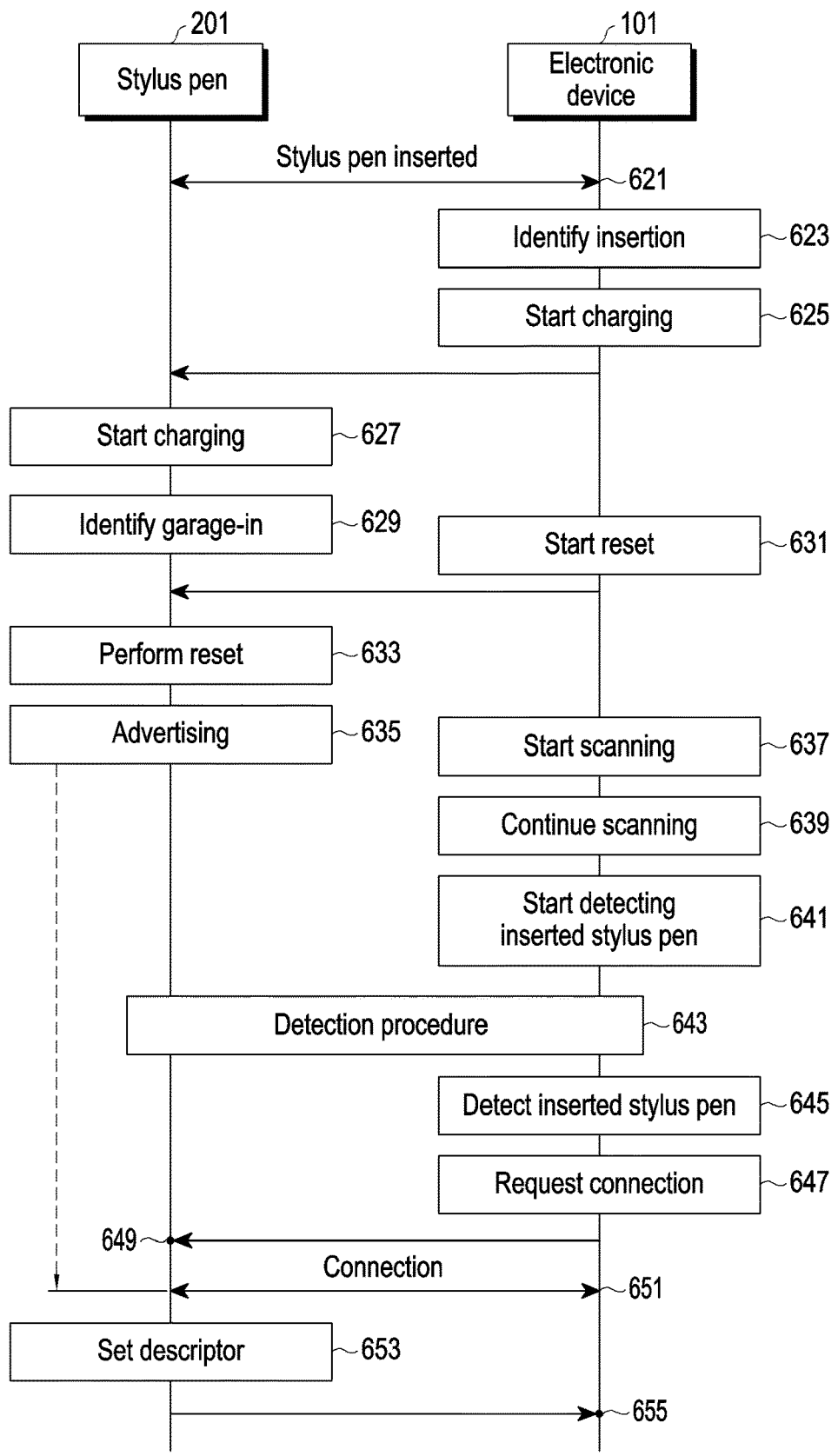
FIG. 6B is a flowchart illustrating a detailed operation, when a stylus pen is inserted into an electronic device according to various embodiments.

FIG. 6B is a flowchart illustrating a detailed operation, when a stylus pen is inserted into an electronic device according to various embodiments.

In operation 621, the stylus pen 201 may be inserted into the garage of the electronic device 101. According to various embodiments, when identifying the insertion in operation 623, the electronic device 101 may start charging in operation 625. The electronic device 101 may transmit, for example, a signal of a pattern indicating the start of charging through the garage coils 411 and 412, or transmit a communication signal indicating the start of charging to the stylus pen 201 through the communication module. The stylus pen 201 may identify information indicating the start of charging, and perform charging start chg_on in operation 627. For example, the stylus pen 201 may control the charging switch 436 to connect the rectifier 435 to the battery 437. The stylus pen 201 may detect garage-in in operation 629. In operation 631, the electronic device 101 may transmit a reset start command to the stylus pen 201. The stylus pen 201 may be reset in operation 633. For example, the stylus pen 201 may initialize the BLE module.

According to various embodiments, in operation 635, the stylus pen 201 may perform an advertising procedure. The electronic device 101 may start scanning for the stylus pen in operation 637 and continue scanning in operation 639. For example, the electronic device 101 may perform scanning during a timeout period (e.g., 40 seconds). The electronic device 101 may start to search for the inserted stylus pen in operation 641. Operations 637, 639, and 641 may be performed as one operation depending on implementation. In operation 643, the electronic device 101 and the stylus pen 201 may perform a search procedure. For example, after transmitting a charging start signal, the electronic device 101 may identify whether the stylus pen 201 transmitting the advertisement signal exists. Without the charging start signal, the electronic device 101 may detect the advertisement signal transmitted from the stylus pen 201. According to various embodiments, the stylus pen 201 may be configured to transmit an advertisement signal, when receiving a charging start signal. Accordingly, the electronic device 101 may identify the stylus pen 201 inserted into the electronic device 101 by identifying the advertisement signal received after transmitting the charging start signal. In operation 645, the electronic device 101 may detect the inserted stylus pen 201 based on the above-described process. The electronic device 101 may transmit a connect request to the stylus pen 201 in operation 647, and the stylus pen 201 may receive the connection request in operation 649. In operation 651, the electronic device 101 and the stylus pen 201 may be connected. In operation 653, the stylus pen 201 may set a descriptor and transmit information about the descriptor to the electronic device 101. The electronic device 101 may identify the descriptor. The descriptor may be, for example, a setting for an activated function (e.g., a button event, and device information including battery information), and the type thereof is not limited. In operation 655, the stylus pen 201 may transmit information about the descriptor to the electronic device 101. In various embodiments, the electronic device 101 may identify that there is no need to perform a reset/communication connection with the stylus pen 201, and in this case, the reset start process of operation 631 to the connection process of operation 651 may be omitted.

Figure 6C:
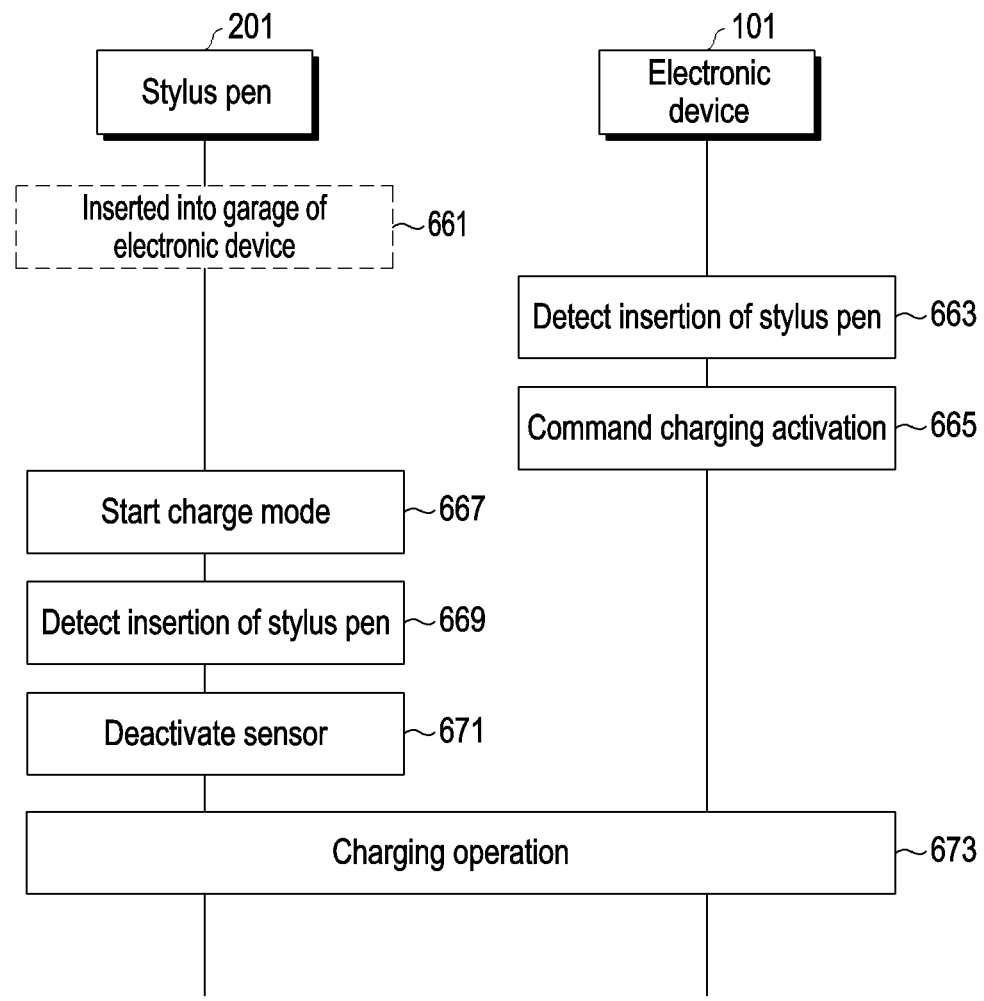
FIG. 6C is a flowchart illustrating operations of an electronic device and a stylus pen, when the stylus pen is inserted into the electronic device according to various embodiments.

FIG. 6C is a flowchart illustrating operations of an electronic device and a stylus pen, when the stylus pen is inserted into the electronic device according to various embodiments.

According to various embodiments, in operation 661, the stylus pen 201 may be inserted into the garage of the electronic device 101. For example, after the stylus pen 201 is initially inserted into the garage and then removed from the garage, the stylus pen 201 may be reinserted. In operation 663, the electronic device 101 may detect the insertion of the stylus pen 201. In operation 665, the electronic device 101 may command the stylus pen 201 to activate charging. The electronic device 101 may command charging activation based on, for example, transmission of a signal having a pattern through the garage coils or transmission of a communication signal through the communication module. In operation 667, the electronic device 101 may start the charge mode. In operation 669, the stylus pen 201 may detect the insertion of the stylus pen 201. The stylus pen 201 may identify whether the stylus pen 201 has been inserted based on information received from the electronic device 101 or the magnitude of a voltage applied to the resonant circuit (or the output terminal of the rectifier) of the stylus pen 201. In operation 671, the stylus pen 201 may deactivate a sensor. The stylus pen 201 may deactivate some sensors or may be configured to skip the sensor deactivation. In operation 673, the electronic device 101 and the stylus pen 201 may perform a charging operation. In various embodiments, the charging operation 673 may be performed immediately after initiation of the charge mode in operation 667, and the time of the charging operation is not limited.

Figure 7:
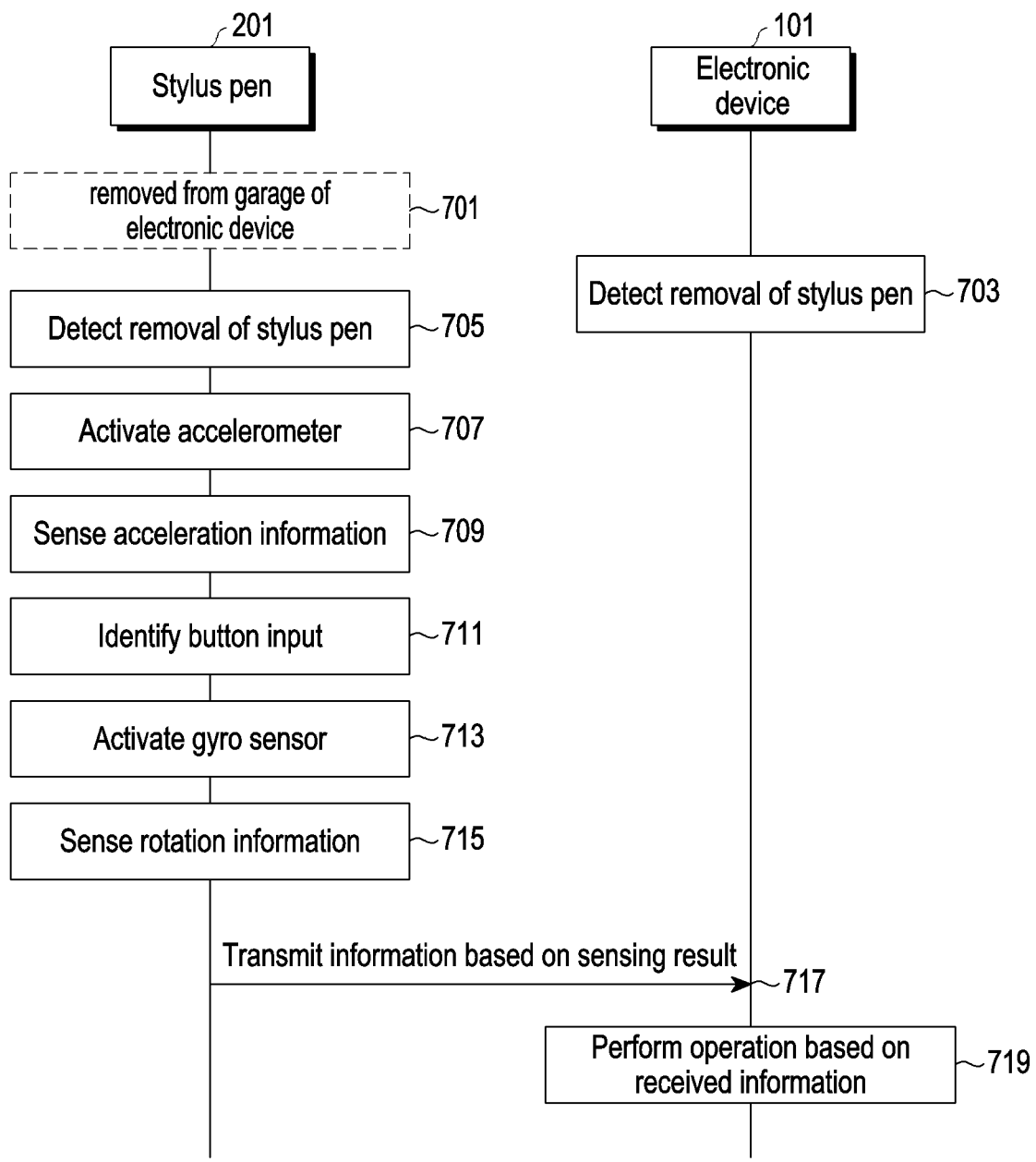
FIG. 7 is a flowchart illustrating operations of the stylus pen and an electronic device, when the stylus pen is removed from the electronic device according to various embodiments.

FIG. 7 is a flowchart illustrating operations of a stylus pen and an electronic device, when the stylus pen is removed from the electronic device according to various embodiments.

According to various embodiments, in operation 701, the stylus pen 201 (e.g., the stylus pen 201 of FIG. 2) may be removed from the garage of the electronic device 101 (e.g., the electronic device 101 of FIG. 1). For example, the user may take out the stylus pen 201 from the garage of the electronic device 101. In operation 703, the electronic device 101 may detect the removal of the stylus pen 201. For example, the electronic device 101 may detect the removal of the stylus pen 201 based on no reception of a response signal to a detection signal from the garage coils 411 and 412. However, the method of detecting the removal is not limited. The electronic device 101 may be configured to identify insertion/removal of the stylus pen 201 based on sensing data from a detection sensor such as a hall sensor. In operation 705, the stylus pen 201 may detect the removal of the stylus pen 201. For example, the stylus pen 201 may detect the removal of the stylus pen 201 based on no reception of a signal from the electronic device 101 according to the voltage VM of the output terminal of the rectifier 431. However, the removal detection method is not limited. Upon detection of the removal, the stylus pen 201 may exchange parameters (e.g., a connection interval and/or a slave latency) with the electronic device 101.

According to various embodiments, the stylus pen 201 may activate the accelerometer based on the detection of the removal in operation 707. The stylus pen 201 may sense acceleration information about the stylus pen 201 through the activated accelerometer in operation 709. While not shown, the stylus pen 201 may transmit the sensed acceleration information to the electronic device 101. In various embodiments, the electronic device 101 may perform an operation based on the received acceleration information. In various embodiments, the stylus pen 201 may be configured to activate the accelerometer and maintain the gyro sensor consuming relatively high power in an inactive state.

According to various embodiments, the stylus pen 201 may identify an input of a button (e.g., the button 337) in operation 711. When identifying the button input, the stylus pen 201 may activate the gyro sensor in operation 713. The stylus pen 201 may sense rotation information through the activated gyro sensor in operation 715. In operation 717, the stylus pen 201 may transmit information based on the sensing result. For example, the stylus pen 201 may transmit sensing information obtained through the accelerometer and/or the gyro sensor to the electronic device 101. Alternatively, the stylus pen 201 may identify the coordinates (e.g., two-dimensional coordinates or three-dimensional coordinates) of the stylus pen 201 based on the sensing information obtained through the accelerometer and the gyro sensor, and transmit the identified coordinates to the electronic device 101. Alternatively, the stylus pen 201 may identify displacement information about the coordinates (e.g., two-dimensional coordinates or three-dimensional coordinates) of the stylus pen 201 based on the sensing information obtained through the accelerometer and the gyro sensor, and transmit the identified displacement information to the electronic device 101. The stylus pen 201 may estimate an initial orientation of the stylus pen 201 based on information measured by the accelerometer and use the estimated initial orientation to correct the position information.

According to various embodiments, in operation 719, the electronic device 101 may perform an operation based on the received information. When receiving the sensing information, the electronic device 101 may identify position information about the stylus pen 201 based on the sensing information, identify a gesture corresponding to the position information, and perform an operation corresponding to the gesture. When receiving the position information about the stylus pen 201, the electronic device 101 may identify the gesture corresponding to the position information and perform the operation corresponding to the gesture. For example, the stylus pen 201 may transmit information to the electronic device 101 until the input of the pen button is released. The electronic device 101 may identify the gesture based on the identified position information about the stylus pen 201 until detecting the release of the button input. When the release of the button input is detected, the stylus pen 201 may deactivate the gyro sensor again. In various embodiments, the stylus pen 201 may activate both the gyro sensor and the accelerometer from a time of detecting removal. In this case, the position information about the stylus pen 201 before the button input may be used to correct the direction of the gesture, and gesture recognition accuracy may be improved. For example, the electronic device 101 may identify the initial orientation information about the stylus pen 201 and recognize a gesture by using a displacement based on the initial orientation information.

Figure 8A:
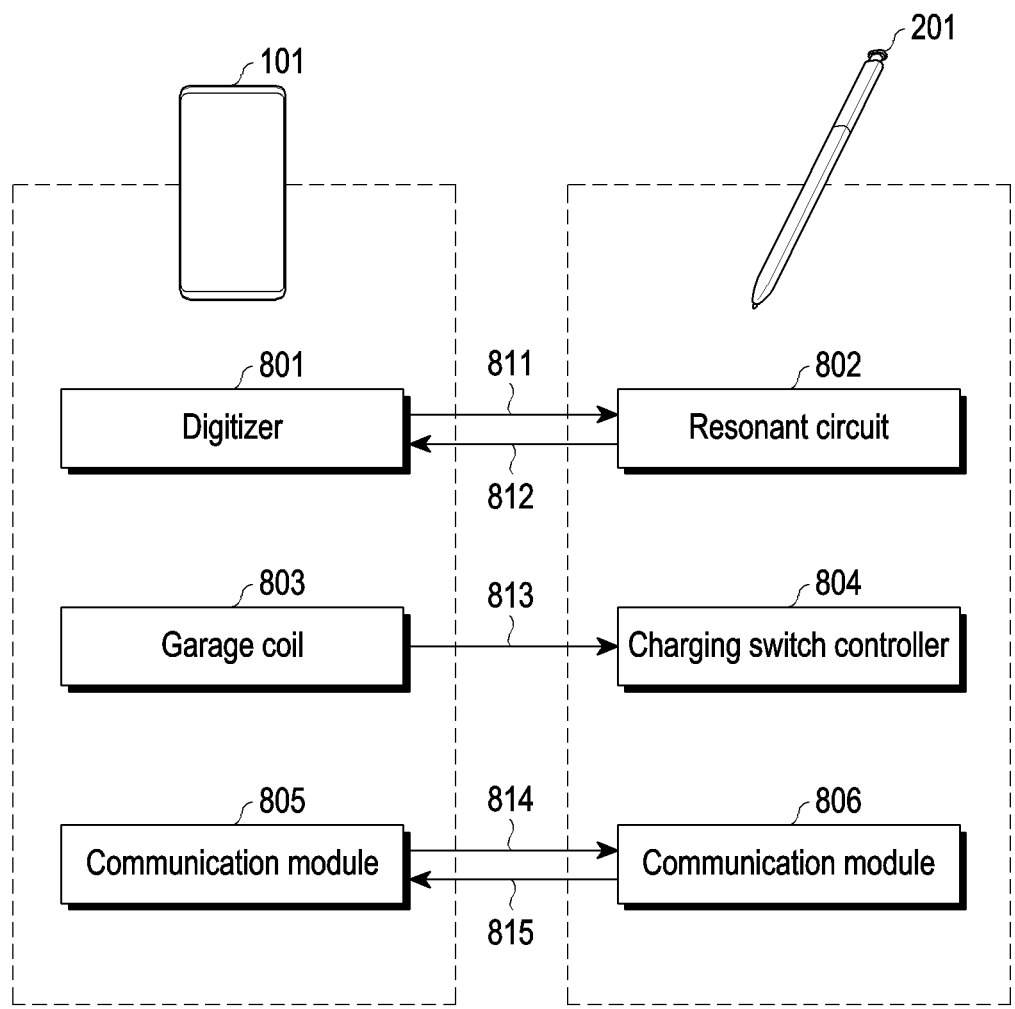
FIG. 8A is a diagram illustrating an interface between an electronic device and a stylus pen according to various embodiments.
Figure 8B:
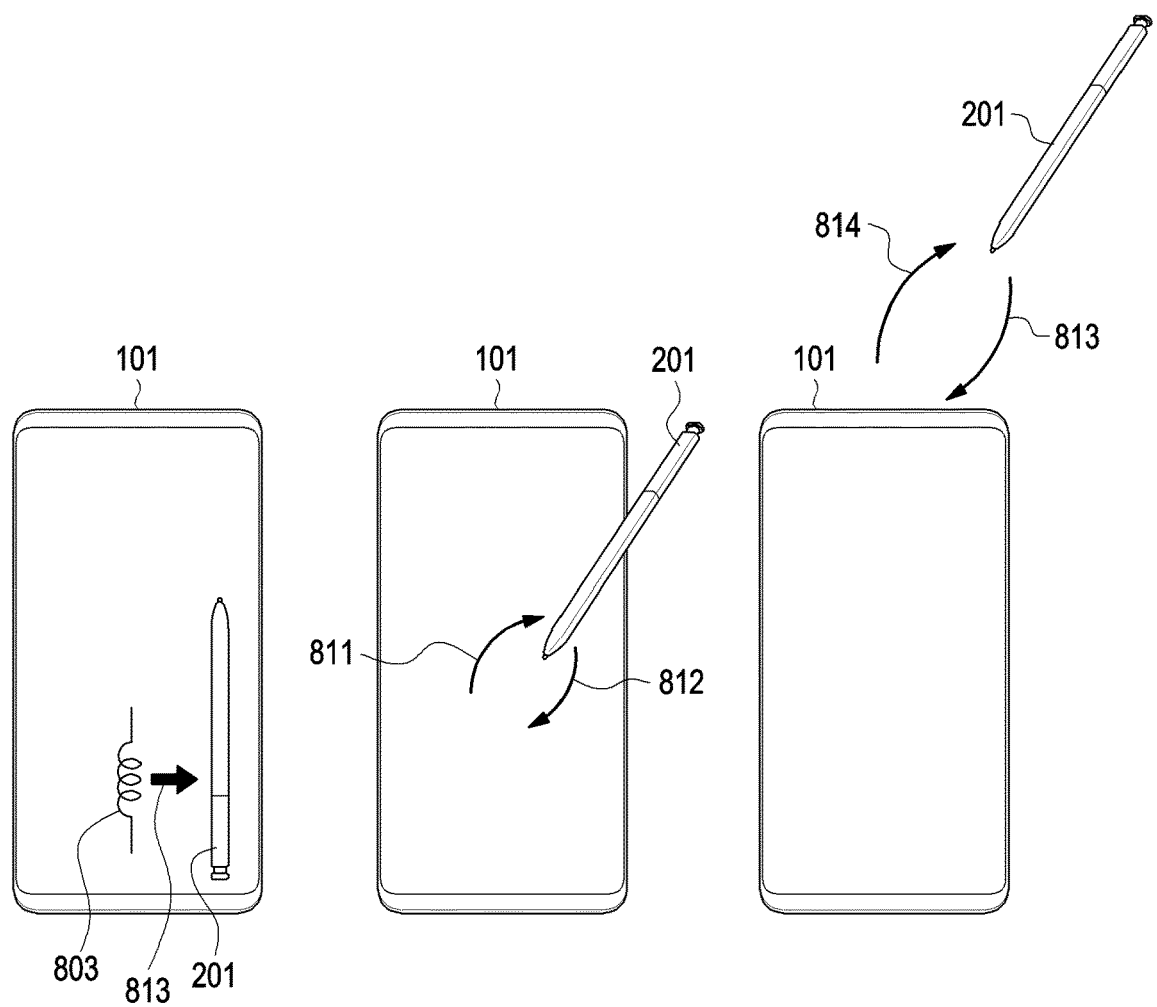
FIG. 8B is a diagram illustrating an interface between an electronic device and a stylus pen according to various embodiments.

FIGS. 8A and 8B are diagrams referred to for describing an interface between an electronic device and a stylus pen according to various embodiments.

Referring to FIGS. 8A and 8B, the electronic device 101 (e.g., the electronic device 101 of FIG. 1) and the stylus pen 201 (e.g., the stylus pen 201 of FIG. 2) may interact with each other in three methods. According to various embodiments, when the stylus pen 201 is inserted into the electronic device 101, the electronic device 101 may transmit a signal 813 through the garage coils (e.g., the coils 411 and 412 of FIG. 4). An induced electromotive force corresponding to the signal 813 may be generated in a coil (e.g., the coil 421 of FIG. 4) of the stylus pen 201 by induction of a magnetic field. The induced electromotive force may be rectified by the rectifier (e.g., the rectifier 431 of FIG. 4). A charging switch controller 804 (e.g., the charging switch controller 432 of FIG. 4) of the stylus pen 201 may analyze the waveform of the voltage VM at the output terminal of the rectifier. The waveform of the voltage VM may correspond to the signal 813. The stylus pen 201 may perform an operation identified based on the result of the waveform analysis of the voltage VM. For example, the stylus pen 201 may perform start charging, initialization, garage-in identification, and charging discontinuation, and these operations are not limited. While not shown, the stylus pen 201 may apply a signal having a pattern (e.g., a signal of the sixth pattern in Table 2) to a resonant circuit 802. The electronic device 101 may analyze an induced electromotive force signal by the signal having the pattern, and identify insertion of the stylus pen 201 based on the analysis result.

According to various embodiments, when the stylus pen 201 is within a recognizable range of the electronic device 101 (e.g., a recognizable range of the digitizer), a digitizer 801 (e.g., the sensing panel 503) of the electronic device 101 and the resonant circuit 802 of the stylus pen 201 may interact with each other. As illustrated in FIGS. 8a and 8b, the stylus pen 201 may resonate by a transmission signal 811 generated from at least one loop coil of the digitizer 801, and a reception signal 812 may be generated by the resonance. The digitizer 801 may identify the position of the stylus pen 201 based on the magnitude of the induced electromotive force generated by the reception signal 812 in each of the plurality of loop coils. In addition, the digitizer 801 may identify whether a button (e.g., the button 337) of the stylus pen 201 has been pressed based on the frequency of the induced electromotive force. Depending on implementation, it may be identified whether the button has been pressed, based on information included in a communication signal 815. In various embodiments, when identifying a gesture based on information included in the communication signal 815 within the recognizable range, the electronic device 101 may perform an operation different from when identifying the gesture based on the information included in the communication signal 815 outside the recognizable range. For example, when an upward swipe gesture is identified by the communication signal 815 from the stylus pen 201 within the recognizable range, the electronic device 101 may perform up-scrolling. When an upward swipe gesture is identified by the communication signal 815 from the stylus pen 201 outside the recognizable range, the electronic device 101 may perform an enlargement operation. However, this is an example, and the electronic device 101 according to various embodiments may be configured to ignore a gesture based on the communication signal 815 from the stylus pen 201 within the recognizable range.

According to various embodiments, when the stylus pen 201 is outside the recognizable range of the electronic device 101 (e.g., the recognizable range of the digitizer), the communication module 805 (e.g., the communication module 190) of the electronic device 101 and the communication module 806 (e.g., the BLE communication circuit and controller 439) of the stylus pen 201 may transmit and receive communication signals 814 and 815. The stylus pen 201 may transmit information about the position of the stylus pen 201 (e.g., the coordinates of the stylus pen 201 and/or a displacement of the stylus pen 201 within the coordinate system) identified based on a built-in sensor (e.g., the accelerometer, the gyro sensor, and the geomagnetic sensor) in the communication signal 815 to the electronic device 101. The stylus pen 201 may transmit information indicating whether the button has been pressed in the communication signal 815 to the electronic device 101. The stylus pen 201 may transmit state information in the communication signal 815 to the electronic device 101. The electronic device 101 may transmit state information and/or control information in the communication signal 814. The electronic device 101 may move the cursor, identify a gesture, and perform a corresponding operation, and/or an operation corresponding to button pressing in an air mouse mode, based on the received information about the position of the stylus pen 201 and/or the information indicating whether the button has been pressed.

Figure 9:
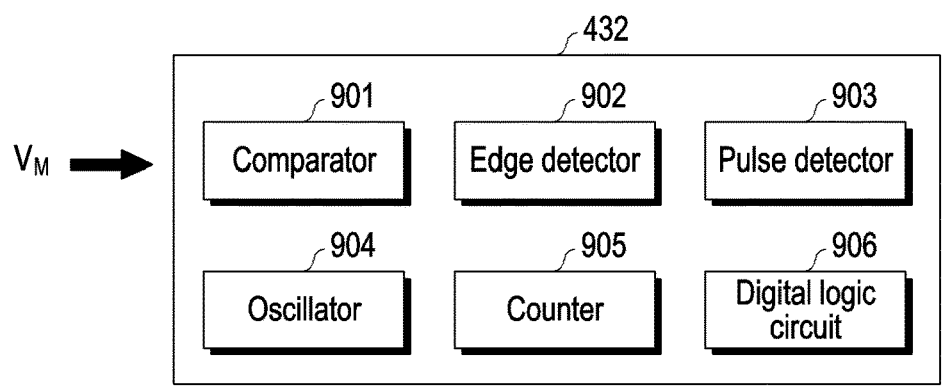
FIG. 9 is a block diagram illustrating a charging switch controller according to various embodiments.

FIG. 9 is a block diagram illustrating a charging switch controller according to various embodiments. The charging switch controller 432 (e.g., the charging switch controller 432 of FIG. 4) according to various embodiments may include at least one comparator 901, at least one edge detector 902, at least one pulse detector, at least one oscillator 904, at least one counter 905, and/or at least one digital logic circuit 906.

According to various embodiments, the at least one comparator 901 may compare an input voltage with a reference voltage and output a high signal or a low signal based on the comparison result. The at least one comparator 901 may apply, for example, the reference voltage so that the reference voltage is hysteresis. For example, the reference voltage is set to a high reference voltage (e.g. 3.5V) in the rising period of the rectifier output voltage VM and to a low reference voltage (e.g. 1.5V) in the falling period of the signal output from the resonant circuit.

According to various embodiments, the at least one edge detector 902 may detect whether an edge is generated in an input signal and output an output signal, upon detection of an edge. The at least one pulse detector 903 may detect whether a pulse is generated in the input signal and output an output signal upon detection of a pulse. The at least one oscillator 904 may output, for example, a reference clock for determining time. The at least one counter 905 may count the number of input pulses and output a counting result. The at least one digital logic circuit 906 may identify information indicated by the pattern of a signal transmitted by the electronic device 101 based on the counting result obtained from the at least one counter 905. The at least one digital logic circuit 906 may output a control signal corresponding to the identified information. For example, the at least one digital logic circuit 906 may transmit a charging start signal to the charging switch 436. For example, the at least one digital logic circuit 906 may transmit a communication reset signal to the BLE communication circuit and controller 439. For example, when insertion into the garage is completed, the at least one digital logic circuit 906 may transmit a signal indicating garage-in to the BLE communication circuit and controller 439.

Figure 10:
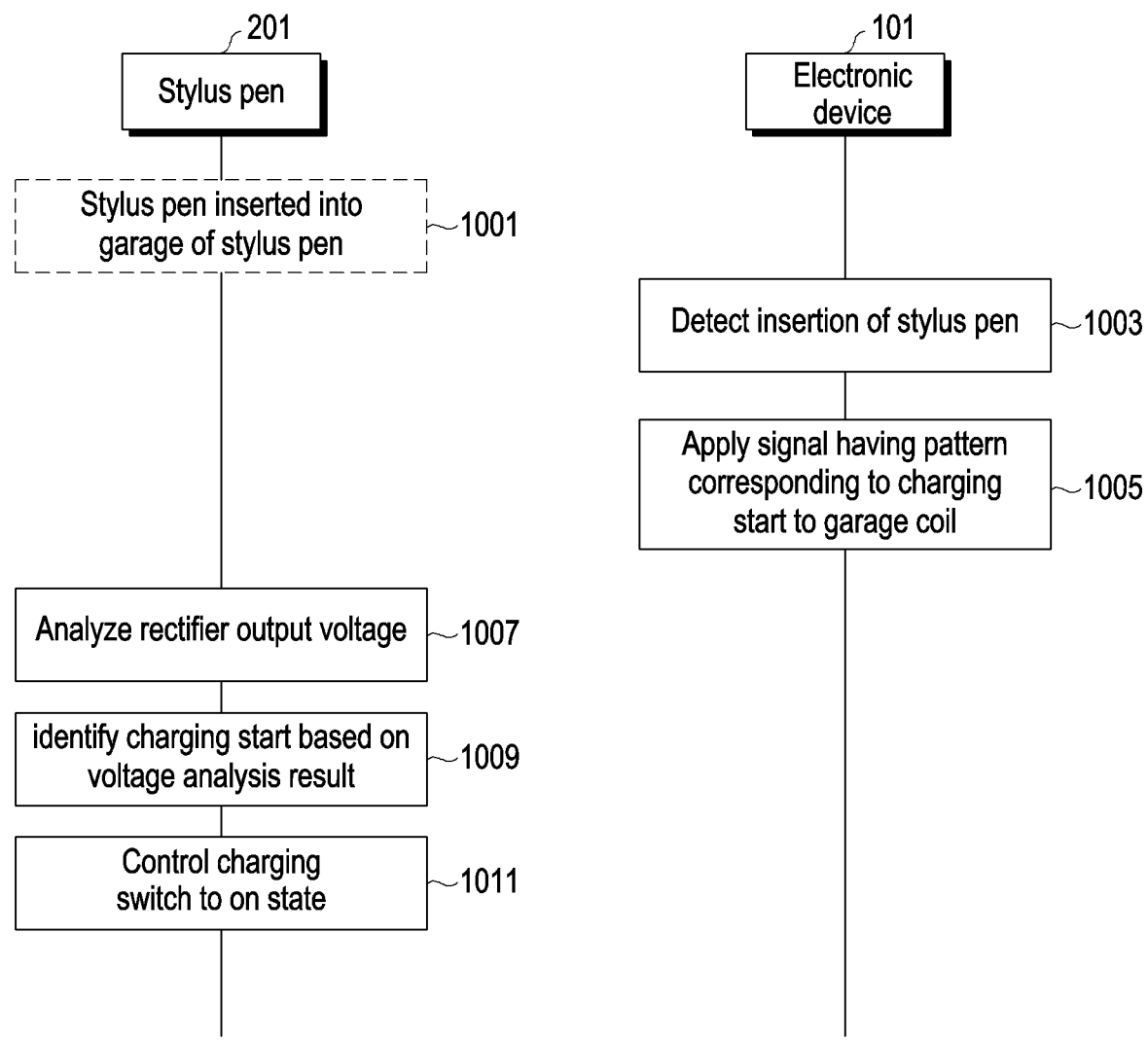
FIG. 10 is a flowchart illustrating a method of operating an electronic device and a stylus pen according to various embodiments.

FIG. 10 is a flowchart illustrating a method of operating an electronic device and a stylus pen according to various embodiments.

In operation 1001, the stylus pen 201 (e.g., the stylus pen 201 of FIG. 2) may be inserted into the garage of the electronic device 101 (e.g., the electronic device 101 of FIG. 1). For example, the user may insert the stylus pen 201 into the garage of the electronic device 101, and the operation is marked with a dotted line based on the fact that the operation is not an active operation of the stylus pen 201. According to various embodiments, in operation 1003, the electronic device 101 may detect the insertion of the stylus pen 201. The electronic device 101 may apply, for example, a detection signal to the garage coils (e.g., the coils 411 and 412), and detect whether the stylus pen 201 has been inserted, based on whether a response signal is received from the stylus pen 201. Alternatively, the electronic device 101 may detect whether the stylus pen 201 has been inserted based on a sensing result of a separate sensor (e.g., a hall sensor) for detecting the insertion of the stylus pen 201. The method of detecting whether the stylus pen 201 is inserted by the electronic device 101 is not limited. In operation 1005, the electronic device 101 may apply a signal having a pattern corresponding to the start of charging to the garage coils, based on the detection of the insertion of the stylus pen 201.

According to various embodiments, the stylus pen 201 may analyze a rectifier output voltage (e.g., the output voltage VM of the rectifier 431 of FIG. 4) in operation 1007. In operation 1009, the stylus pen 201 may identify the start of charging based on the voltage analysis result. The stylus pen 201 may control the charging switch (e.g., the charging switch 436 of FIG. 4) to be turned on based on the identification of the start of charging in operation 1011. As the charging switch is controlled to the on state, a charging signal may be transmitted to the battery. In various embodiments, the stylus pen 201 may analyze voltages at various points (e.g., the output terminal of the coil 421) other than the output terminal of the rectifier to identify information indicated by the electronic device 101. In various embodiments, the stylus pen 201 may identify the information indicated by the electronic device 101 based on a current, power, or impedance in addition to a voltage.

Figure 11:
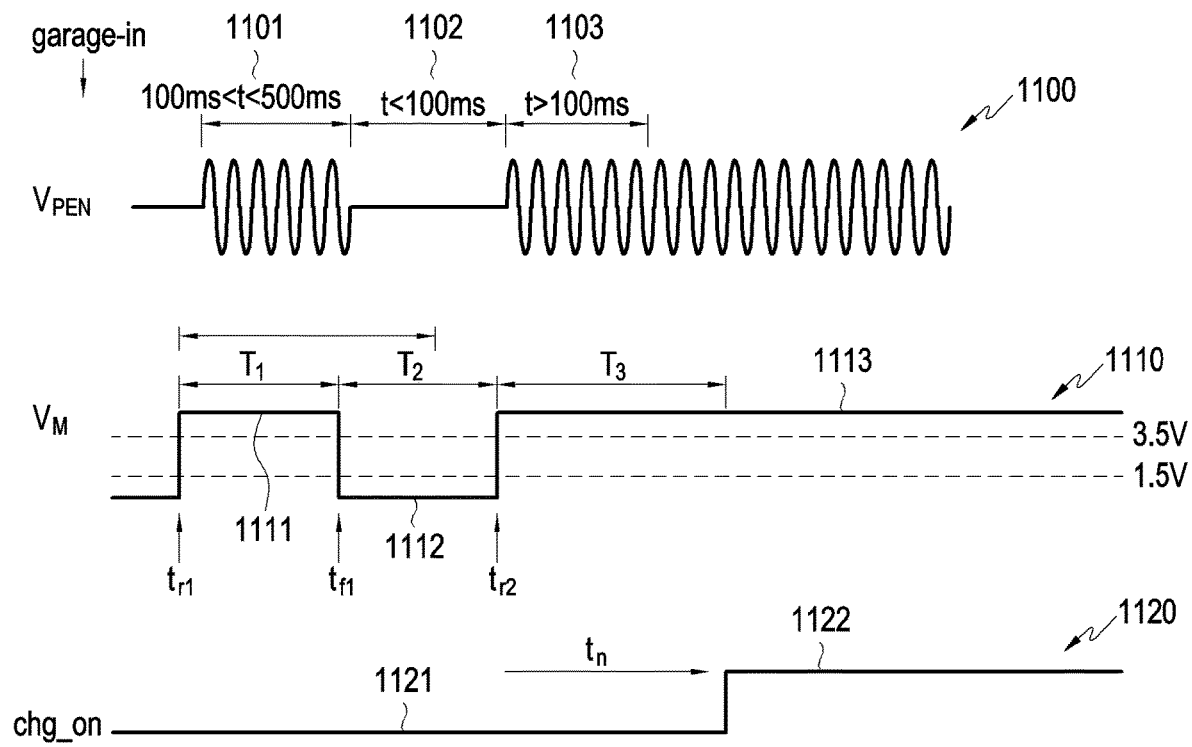
FIG. 11 is a diagram illustrating waveforms, referred to for describing a charging initiation process according to various embodiments.

FIG. 11 illustrates waveforms referred to for describing a charging initiation process according to various embodiments.

According to various embodiments, upon detection of insertion (garage-in) of the stylus pen 201 (e.g., the stylus pen 201 of FIG. 2), the electronic device 101 (e.g., the electronic device 101 of FIG. 1) may apply a signal indicating the start of charging to the garage coils (e.g., the coils 411 and 412). When a signal is generated, an induced electromotive force Vpen 1100 may be generated in the coil 421 of the stylus pen 201 by electromagnetic induction. The induced electromotive force 1100 may have substantially the same waveform as the signal (or a waveform with an inverted phase). The induced electromotive force 1100 may include a first part 1101 of a square wave, a second part 1102 of an off period, and a third part 1103 of the square wave. The induced electromotive force 1100 may be rectified by the rectifier 431, and a voltage VM 1110 of the output terminal of the rectifier 431 may be identified. The voltage VM 1110 of the output terminal may include a first part 1111 that is a high period, a second part 1112 that is a low period, and a third part 1113 that is a high period. The at least one comparator 901 may generate an output signal based on a voltage exceeding a high reference voltage (e.g., 3.5V) at time $t_{r1}$, for example. The at least one comparator 901 may discontinue generating the output signal based on a voltage being less than or equal to a low reference voltage (e.g., 1.5V) at time $t_{f1}$. The at least one comparator 901 may generate an output signal based on a voltage exceeding the high reference voltage (e.g., 3.5V) at time $t_{r2}$, for example. The at least one edge detector 902 may detect edges at time $t_{r1}$, time $t_{f1}$, and time $t_{r2}$. The at least one counter 905 may count the number of pulses output from the oscillator 904. The counter 905 may, for example, count the number of pulses between edge detection time points, which may correspond to a time period between edge detection time points. The digital logic circuit 906 may identify whether the time between time $t_{r1}$ and time $t_{f1}$ exceeds T1 and is less than T3 as a first condition. The digital logic circuit 906 may identify whether the time between time $t_{r2}$ and time $t_{f1}$ is less than T2 as a second condition. The digital logic circuit 906 may identify whether a high signal holding time $t_{r1}$ after time $t_{r2}$ is equal to or greater than T4 as a third condition after the first condition and the second condition are satisfied. For example, when it is identified that the first condition, the second condition, and the third condition are satisfied, the digital logic circuit 906 may transition a charging start signal chg_on 1120 from a low signal 1121 to a high signal 1122. The charging switch 436 may be controlled to be turned on by the high signal 1122.

Figure 12:
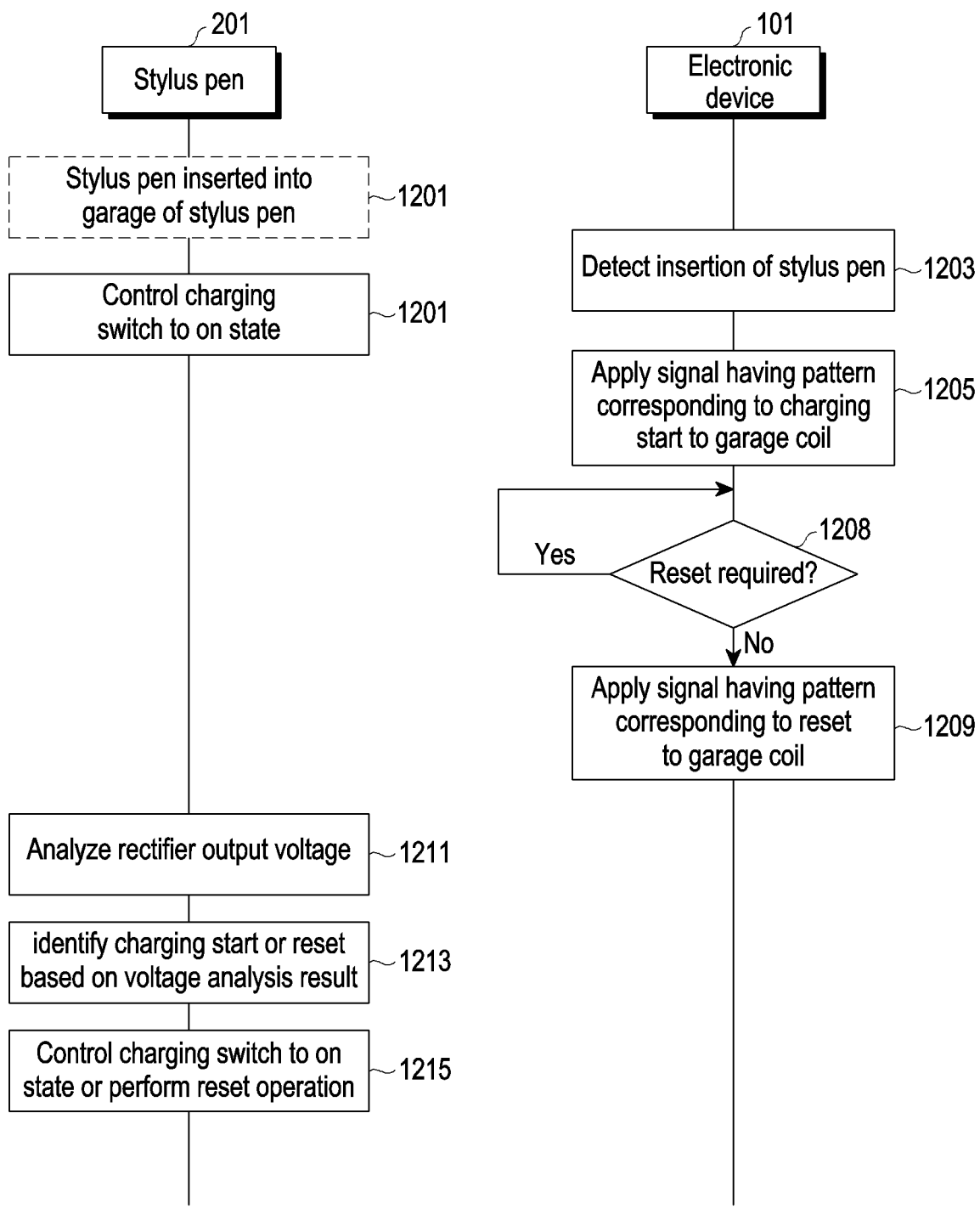
FIG. 12 is a flowchart illustrating a method of operating an electronic device and a stylus pen according to various embodiments.

FIG. 12 is a flowchart illustrating a method of operating an electronic device and a stylus pen according to various embodiments.

In operation 1201, the stylus pen 201 (e.g., the stylus pen 201 of FIG. 2) may be inserted into the garage of the electronic device 101 (e.g., the electronic device 101 of FIG. 1). In operation 1203, the electronic device 101 may detect the insertion of the stylus pen 201. In operation 1205, the electronic device 101 may apply a signal having a pattern corresponding to the start of charging to the garage coils, based on the detection of the insertion of the stylus pen 201. In operation 1207, the stylus pen 201 may control the charging switch to the on state based on a pattern analysis result and start charging. In operation 1208, the electronic device 101 may determine whether the stylus pen 201 needs to be reset. For example, when an idle state, a communication stuck state, and the initial insertion of the stylus pen 201 are identified, the electronic device 101 may determine that the stylus pen 201 needs to be reset. When the reset is not requested (1208—NO), the electronic device 101 may maintain charging, while monitoring periodically or aperiodically whether the reset is requested. When it is identified that reset is required (1208—Yes), the electronic device 101 may apply a signal having a pattern corresponding to reset to the garage coils in operation 1209.

According to various embodiments, the stylus pen 201 may analyze a rectifier output voltage (e.g., the output voltage VM of the rectifier 431 of FIG. 4) in operation 1211. In operation 1213, the stylus pen 201 may identify a charging start or reset instruction based on a voltage analysis result. The stylus pen 201 may control the charging switch (e.g., the charging switch 436 of FIG. 4) to the on state based on the identification of the start of charging, or initialize the BLE module based on the identification of the reset instruction, in operation 1215.

Figure 13:
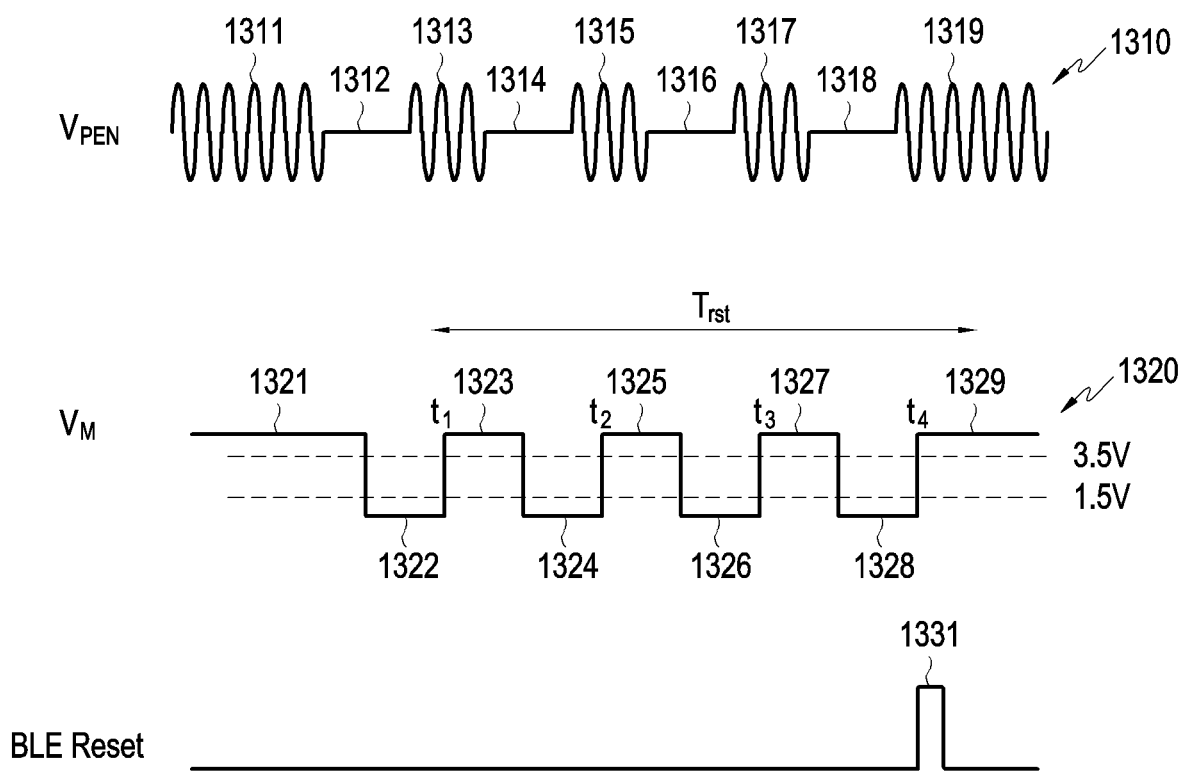
FIG. 13 is a diagram illustrating waveforms, referred to for describing a reset process according to various embodiments.

FIG. 13 illustrates waveforms referred to for describing a reset process according to various embodiments.

According to various embodiments, when identifying that a reset is required, the electronic device 101 (e.g., the electronic device 101 of FIG. 1) may apply a signal indicating a reset instruction to the garage coils (e.g., the coils 411 and 412). When the signal is generated, an induced electromotive force Vpen 1310 may be generated in the coil 421 of the stylus pen 201 (e.g., the stylus pen 201 of FIG. 2) by electromagnetic induction. The induced electromotive force 1310 may have a waveform substantially identical to that of the signal (or a waveform with an inverted phase). The induced electromotive force 1310 may include a first part 1311, a third part 1313, a fifth part 1315, a seventh part 1317, a ninth part 1319 of a square wave, and a second part 1312, a fourth part 1314, a sixth part 1316, and an eighth part 1318 of an off period. The induced electromotive force 1100 may be rectified by the rectifier 431, and a voltage VM 1320 of the output terminal of the rectifier 431 may be identified. The voltage VM 1320 of the output terminal may include a first part 1321, a third part 1323, a fifth part 1325, a seventh part 1327, and a ninth part 1329 which are high, and a second part 1322, a fourth part 1324, a sixth part 1326, and an eighth part 1328 which are low.

The at least one comparator 901 may generate an output signal based on a voltage exceeding a high reference voltage (e.g., 3.5V) at time $t_1$, time $t_2$, time $t_3$, and time $t_4$. The at least one edge detector 902 may detect rising edges at time $t_1$, time $t_2$, time $t_3$, and time $t_4$. The at least one counter 905 may count the number of pulses output from the oscillator 904. The counter 905 may, for example, count the number of pulses between edge detection time points, which may correspond to a time period between the rising edge detection time points. When a specified number of (e.g., 4) rising edges are detected, and the detection time $t_4$ to $t_1$ of the specified number of rising edges is within a specified threshold period $T_{rst}$, the digital logic circuit 906 may detect the reset instruction. Upon detection of the reset instruction, the digital logic circuit 906 may output a reset signal 1331 to the BLE module in response to the detection of the reset instruction, and the BLE module may perform reset based on the reset signal.

Figure 14A:
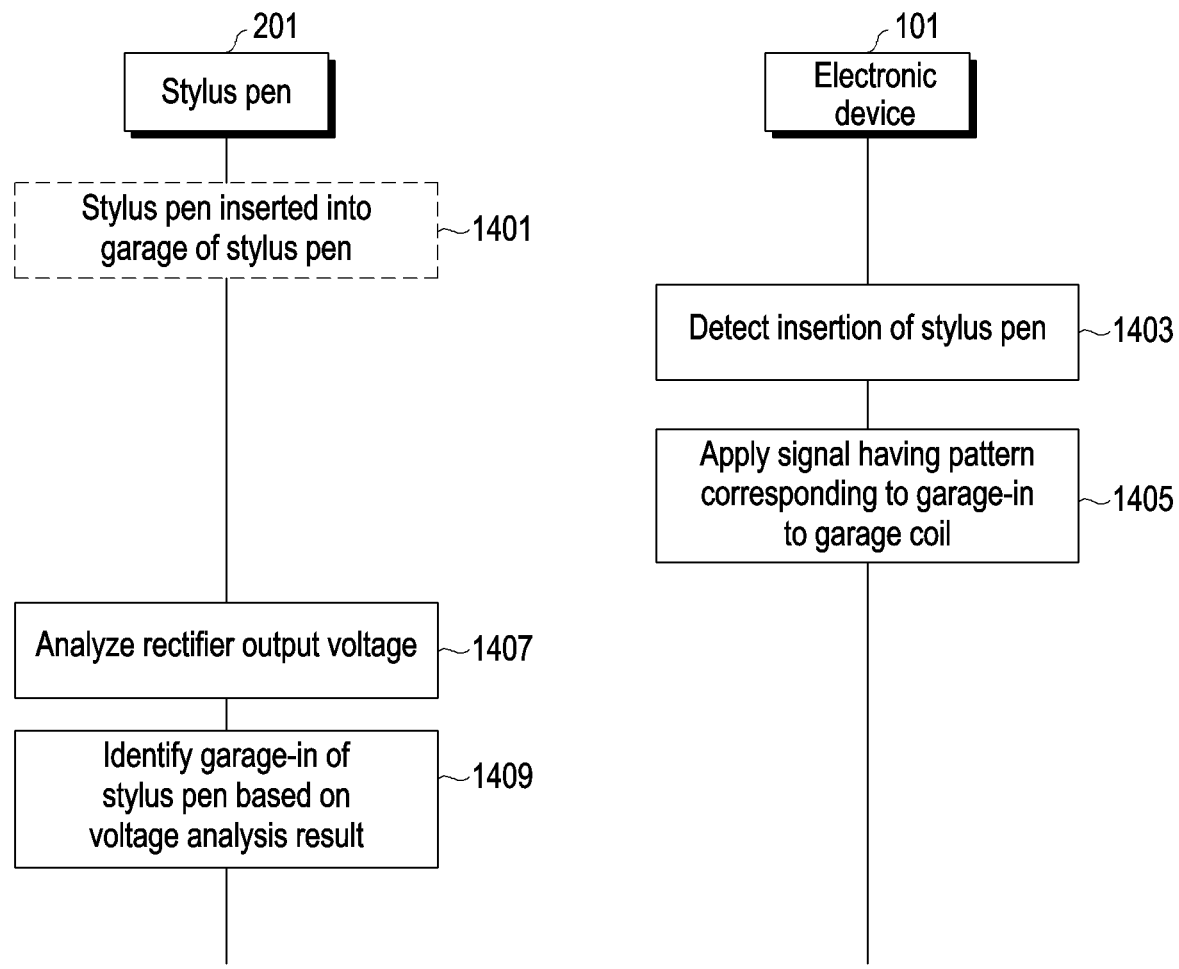
FIG. 14A is a flowchart illustrating a method of operating an electronic device according to various embodiments.

FIG. 14A is a flowchart illustrating a method of operating an electronic device according to various embodiments.

In operation 1401, the stylus pen 201 (e.g., the stylus pen 201 of FIG. 2) may be inserted into the garage of the electronic device 101 (e.g., the electronic device 101 of FIG. 1). In operation 1403, the electronic device 101 may detect the insertion of the stylus pen 201. In operation 1405, the electronic device 101 may apply a signal having a pattern indicating garage-in to the garage coils, based on the detection of the insertion of the stylus pen 201. In operation 1407, the stylus pen 201 may analyze a rectifier output voltage. In operation 1409, the stylus pen 201 may identify that the stylus pen 201 is located in the garage based on a voltage analysis result. When identifying garage-in, the stylus pen 201 may adjust a communication period with the electronic device 101. For example, when identifying that the stylus pen 201 is located in the garage, the stylus pen 201 may set the communication period with the electronic device 101 to be relatively long, thereby reducing power consumption. When identifying that the stylus pen 201 is located in the garage, the sensor and/or the microphone may be turned off or may be controlled to operate in the inactive mode. Alternatively, when the stylus pen 201 is an active pen, a pen tip transmitter may be deactivated.

Figure 14B:
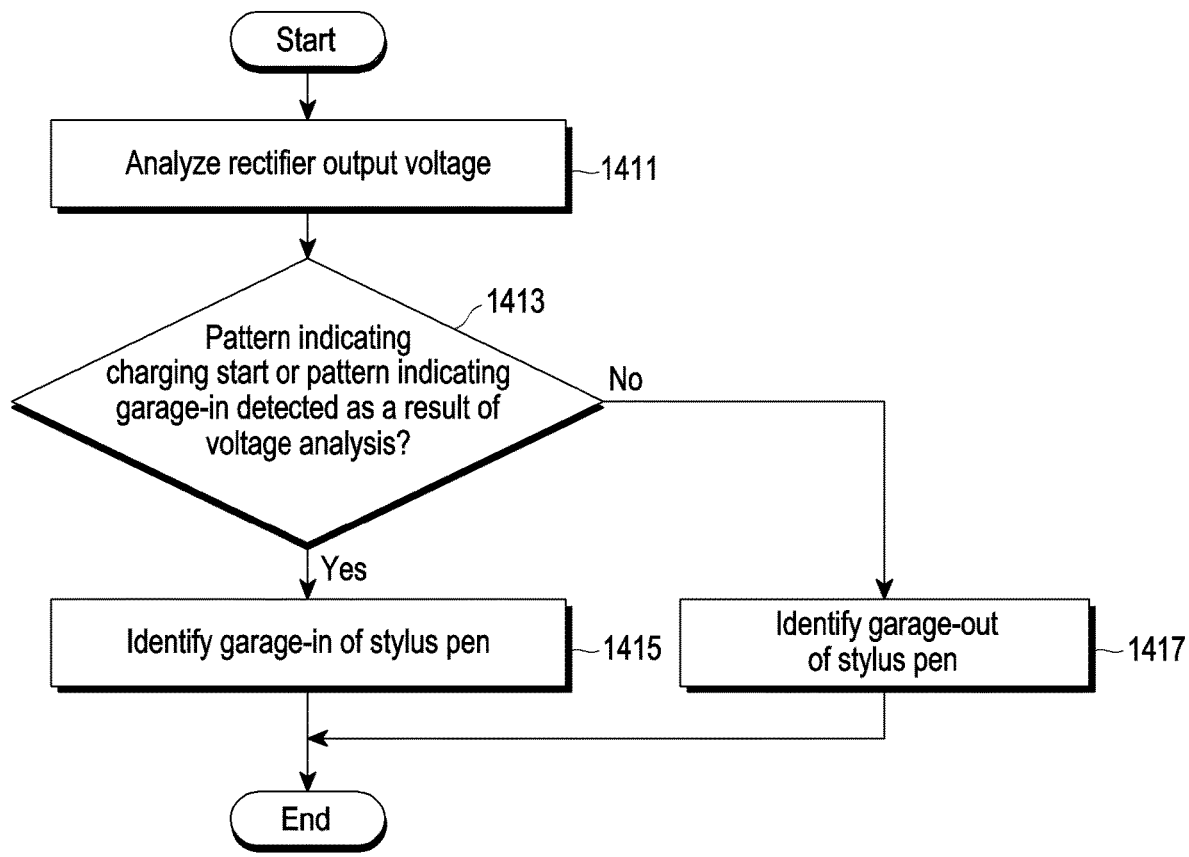
FIG. 14B is a flowchart illustrating a method of operating a stylus pen according to various embodiments.

FIG. 14B is a flowchart illustrating a method of operating a stylus pen according to various embodiments.

According to various embodiments, in operation 1411, the stylus pen 201 may analyze a rectifier output voltage. In operation 1413, the stylus pen 201 may identify whether a pattern indicating the start of charging start or a pattern indicating garage-in has been detected, as a result of the output voltage analysis. For example, a condition for maintaining a pen garage-in signal may be that three or more pulses are maintained per second, and a condition for disabling the pen garage-in signal may be that pulses are detected less than three times per second, which will be described with reference to FIG. 15. Upon detection of the pattern indicating the start of charging or the pattern indicating garage-in (1413—Yes), the stylus pen 201 may identify that the stylus pen 201 is located in the garage in operation 1415. When the pattern indicating the start of charging or the pattern indicating garage-in is not detected (1413—No), the stylus pen 201 may identify that the stylus pen 201 is located outside the garage in operation 1417.

Figure 15:
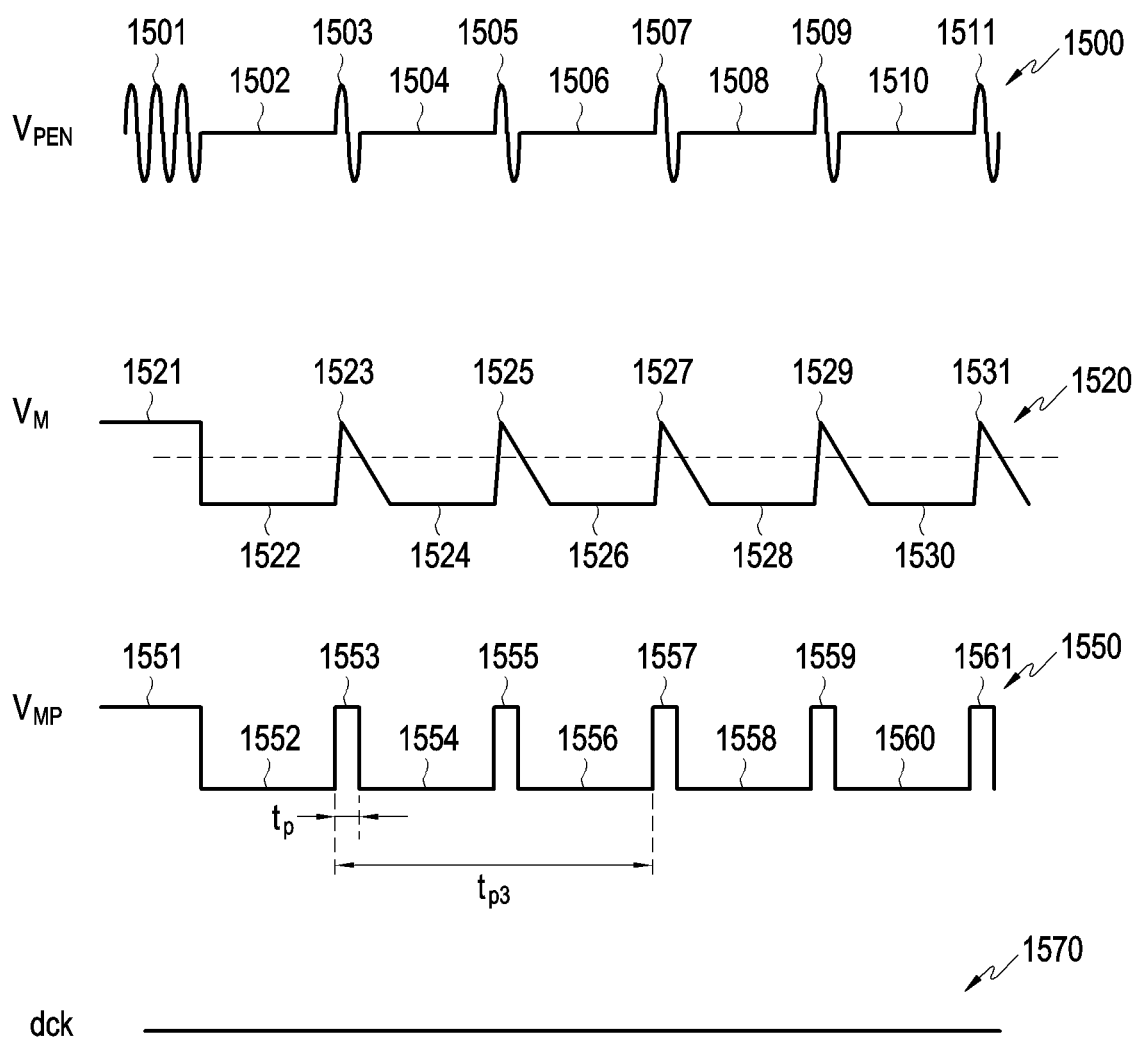
FIG. 15 is a diagram illustrating waveforms, referred to for describing a process of indicating garage-in according to various embodiments.

FIG. 15 is a diagram illustrating waveforms referred to for describing a process of indicating garage-in according to various embodiments.

According to various embodiments, the electronic device 101 (e.g., the electronic device 101 of FIG. 1) may discontinue charging during application of a charging signal to the garage coils (e.g., the coils 411 and 412). After the charging is stopped, the electronic device 101 may apply a signal identifying garage-in every specified period. When a signal is generated, an induced electromotive force Vpen 1500 may be generated in the coil 421 of the stylus pen 201 (e.g., the stylus pen 201 of FIG. 2) by electromagnetic induction. The induced electromotive force Vpen 1500 may include a part 1501 corresponding to a charging signal, off periods 1502, 1504, 1506, 1508, and 1510 each corresponding to the specified period, and parts 1503, 1505, 1507, 1509, and 1511 corresponding to signals. The induced electromotive force 1500 may be rectified by the rectifier 431, and a rectified voltage 1520 may be measured. The rectified voltage 1520 may include a part 1521 corresponding to the charging signal, off periods 1522, 1524, 1526, 1528, and 1530, and spike periods 1523, 1525, 1527, 1529, and 1531. The at least one comparator 901 may output a comparison result Vmp 1550 according to a result of comparison between the rectified voltage 1520 and a reference voltage, and the comparison result 1550 may include a part 1551 corresponding to the charging signal, off periods 1552, 1554, 1556, 1558, and 1560, and pulses 1553, 1555, 1557, 1559, and 1561. The reference voltage may be configured to be, for example, hysteresis and have a different magnitude from the reference voltage used in another signal identification process. The pulse detector 903 may detect the pulses 1553, 1555, 1557, 1559, and 1561 of the comparison result 1550, and the counter 905 may count the number of pulses generated by the oscillator 904 during a pulse period. A pulse width may be, for example, tp. The digital logic circuit 906 may identify the time between occurrences of the pulses 1553, 1555, 1557, 1559, and 1561 by checking the counting result. For example, when the digital logic circuit 906 detects the pulses 1553, 1555, 1557, 1559, and 1561 more than a specified threshold number (e.g., three), and identifies that the specified threshold number of pulses have been detected within a threshold time (e.g., tp3), the digital logic circuit 906 may identify that the stylus pen 201 is located in the garage of the electronic device 101. The digital logic circuit 906 may output a garage-in indication signal dck 1570. The stylus pen 201 may identify whether the stylus pen 201 has been inserted/removed based on whether the garage-in indication signal dck has been detected.

The waveform analysis methods of FIGS. 11, 13, and 15 is merely exemplary, which should not be construed as limiting. In addition, each pattern is not restrictively mapped to a specific command. For example, those skilled in the art will understand that the waveform analysis method of FIG. 11 may also be used to instruct reset or indicate garage-in.

Figure 16:
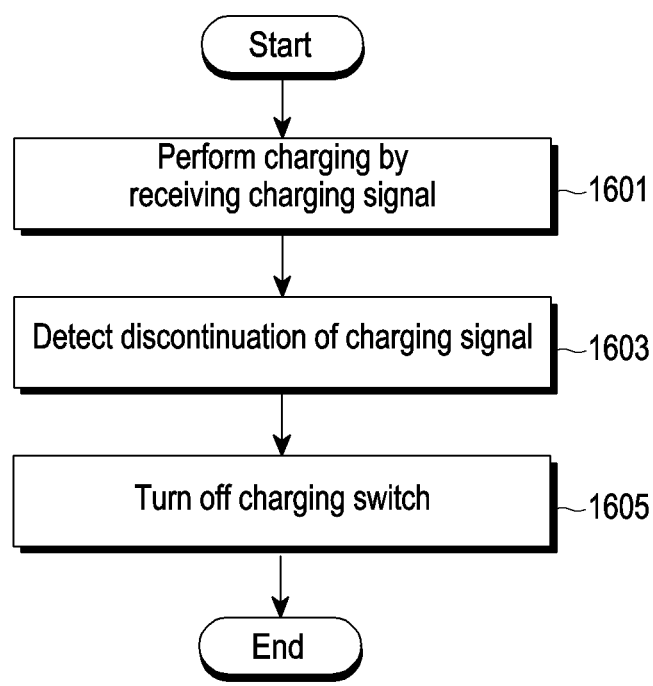
FIG. 16 is a flowchart illustrating a method of operating a stylus pen according to various embodiments.
Figure 17:
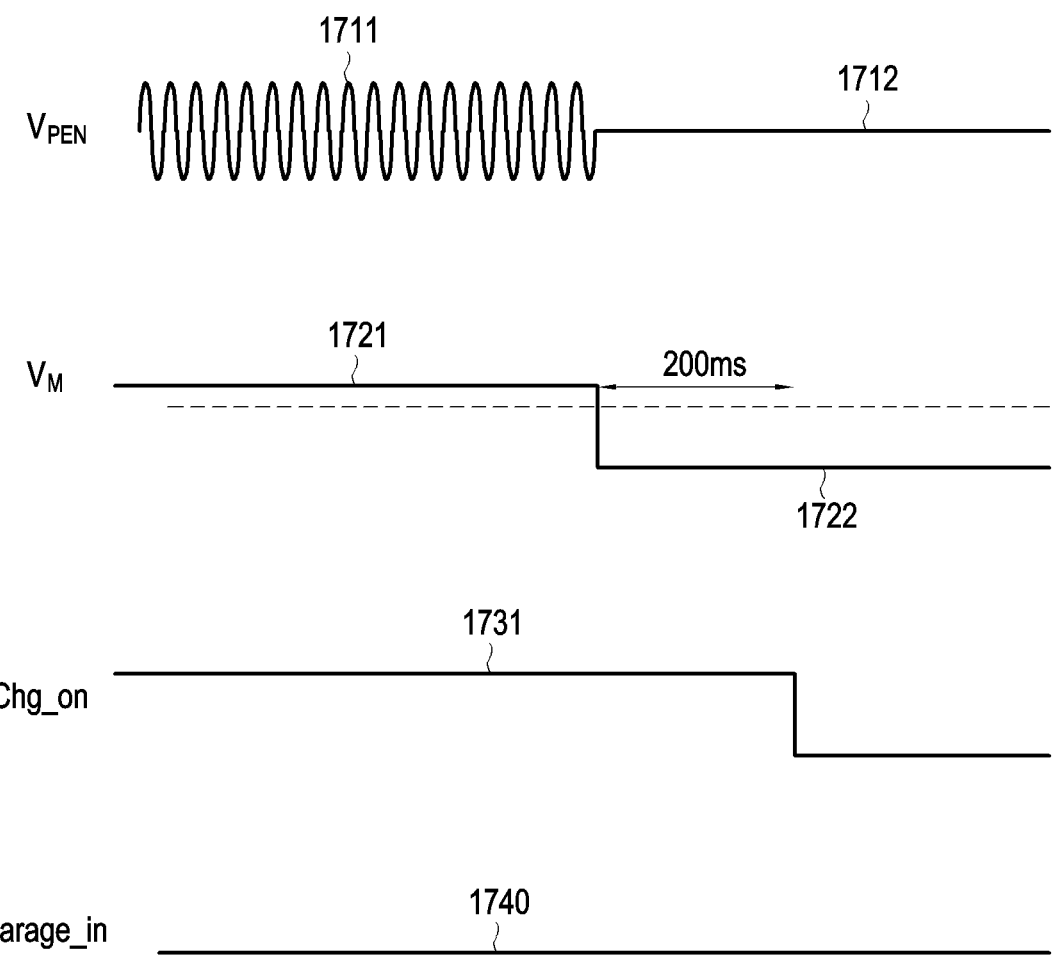
FIG. 17 is a diagram illustrating waveforms, when charging is terminated according to various embodiments.

FIG. 16 is a flowchart illustrating a method of operating a stylus pen according to various embodiments. The embodiment of FIG. 16 will be described with reference to FIG. 17. FIG. 17 illustrates waveforms, when charging is terminated according to various embodiments.

According to various embodiments, in operation 1601, the stylus pen 201 (e.g., the stylus pen 201 of FIG. 2) may receive a charging signal to perform charging. The electronic device 101 (e.g., the electronic device 101 of FIG. 1) may apply the charging signal to the garage coils. An induced electromotive force 1711 corresponding to the charging signal may be generated at the output terminal of the resonant circuit of the stylus pen 201. The induced electromotive force 1711 may be generated as a rectified voltage (e.g., the high signal period 1721) by the rectifier 431, and the battery 437 may be charged. In operation 1603, the stylus pen 201 may detect a charging signal interruption. For example, when identifying that the stylus pen 201 has been fully charged, the electronic device 101 may discontinue providing the charging signal, and an off period 1712 may be identified at the resonant circuit output terminal. An off period 1722 in which the voltage of the output terminal of the rectifier 431 is also substantially 0V may be detected. The stylus pen 201 may identify that the voltage of the output terminal of the rectifier 431 is in the high signal period 1721 and then in the off period 1722. When the duration of the off period 1722 exceeds a threshold duration (e.g., 200 ms), the stylus pen 201 may detect the charging signal interruption. In operation 1605, the stylus pen 201 may turn off the charging switch. The stylus pen 201 may stop applying the charging signal 1731 during application of the charging signal chg_on 1731. The stylus pen 201 may maintain the output of a signal 1740 indicating garage-in.

Figure 18:
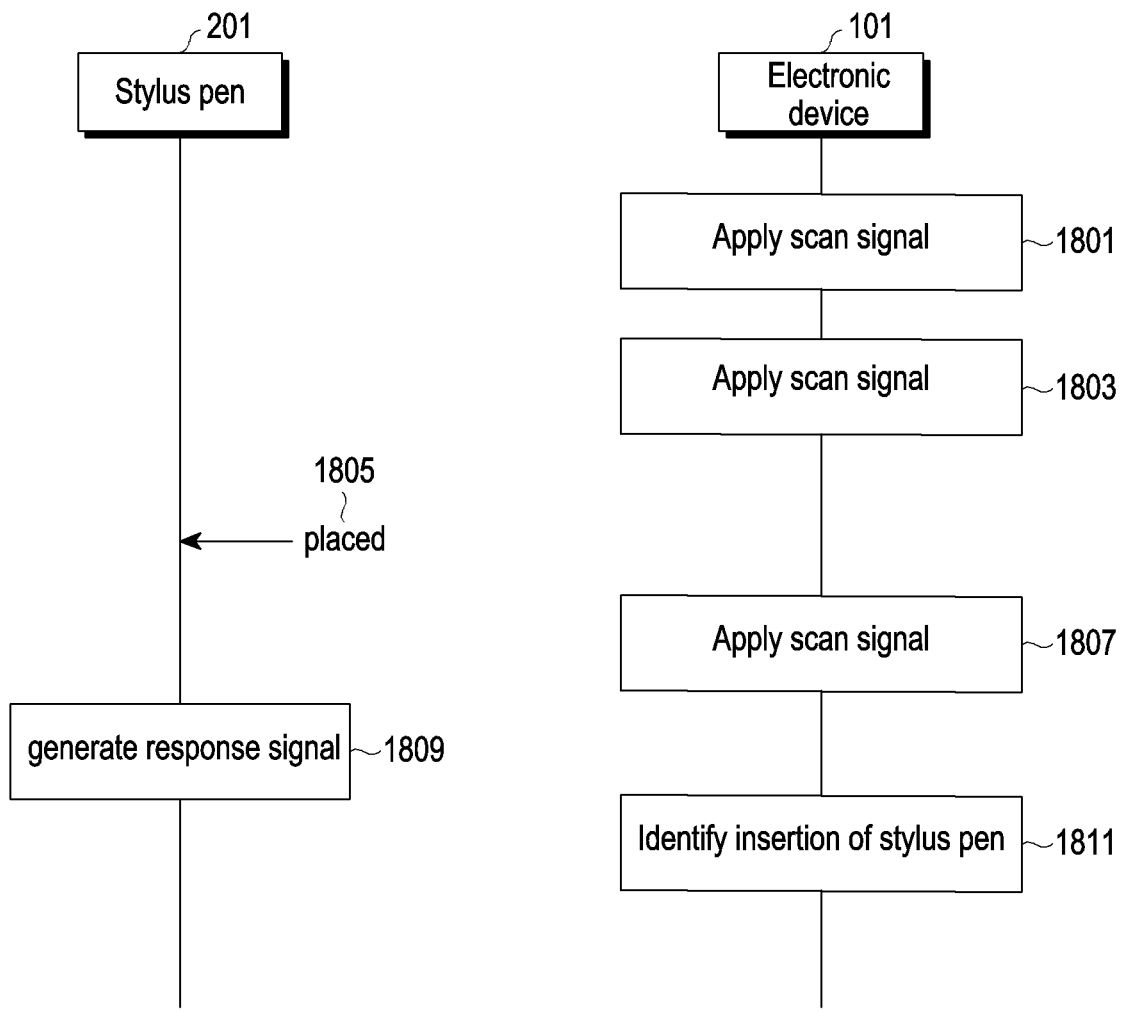
FIG. 18 is a flowchart illustrating a method of operating an electronic device and a stylus pen according to various embodiments.
Figure 19:
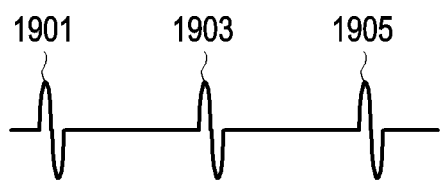
FIG. 19 is diagram illustrating an exemplary scan signal according to various embodiments.

FIG. 18 is a flowchart illustrating a method of operating an electronic device and a stylus pen according to various embodiments. The embodiment of FIG. 18 will be described with reference to FIG. 19. FIG. 19 illustrates an exemplary scan signal according to various embodiments.

According to various embodiments, the electronic device 101 (e.g., the electronic device 101 of FIG. 1) may apply a scan signal to the garage coils (e.g., the coils 411 and 412) in operation 1801. After a predetermined period has elapsed, the electronic device 101 may apply a scan signal in operation 1803. For example, the electronic device 101 may apply scan signals 1901, 1903, and 1905 (e.g., detection signals) of FIG. 19 to the garage coils. In operation 1805, when the stylus pen 201 (e.g., the stylus pen 201 of FIG. 2) is placed, the stylus pen 201 may detect the applied scan signal in operation 1807. In operation 1809, the stylus pen 201 may generate a response signal. In operation 1811, the electronic device 101 may identify insertion of the stylus pen 201. After identifying the insertion of the stylus pen 201, the electronic device 101 may apply a signal corresponding to one of the above-described charging start, reset instruction, and garage-in indication to the garage coils.

In various embodiments, when the stylus pen 201 is an active pen, the stylus pen 201 may periodically transmit a signal, and upon detection of the transmitted signal, the electronic device 101 may identify the insertion of the stylus pen 201. Alternatively, the electronic device 101 may identify whether the stylus pen 201 has been inserted based on an additional sensor (e.g., a hall sensor) for detecting the insertion, as described above.

According to various embodiments, an electronic device (e.g., the electronic device 101) may include a panel (e.g., the sensing panel 503) configured to identify a position of a stylus pen (e.g., the stylus pen 201), a communication module (e.g., the communication module 190) configured to transmit and receive communication signals to and from the stylus pen (e.g., the stylus pen 201), at least one garage coil (e.g., the coils 411 and 412) disposed at a position corresponding to a position of a garage in which the stylus pen (e.g., the stylus pen 201) is accommodatable, and at least one processor (e.g., the processor 120). The at least one processor (e.g., the processor 120) may be configured to, based on the stylus pen (e.g., the stylus pen 201) being identified as inserted into the garage, apply, based on a first communication method, a signal having a pattern for controlling the stylus pen (e.g., the stylus pen 201) (e.g., the coils 411 and 412) to the garage coil, and based on the stylus pen (e.g., the stylus pen 201) being identified as removed from the garage, control the communication module to transmit, based on a second communication method, a communication signal including information for controlling the stylus pen (e.g., the stylus pen 201) to the stylus pen (e.g., the stylus pen 201).

According to various embodiments, the at least one processor (e.g., the processor 120) may be configured to apply, to the garage coil (e.g., the coils 411 and 412), a signal having a first pattern instructing reset of a communication module (e.g., the communication module 190) of the stylus pen (e.g., the stylus pen 201), based on identifying that reset of the stylus pen (e.g., the stylus pen 201) is required.

According to various embodiments, the at least one processor (e.g., the processor 120) may be configured to apply, to the garage coil (e.g., the coils 411 and 412), a signal having a second pattern instructing initiation of charging the stylus pen (e.g., the stylus pen 201), based on the stylus pen (e.g., the stylus pen 201) being identified as inserted into the garage.

According to various embodiments, the at least one processor (e.g., the processor 120) may be configured to apply, to the garage coil (e.g., the coils 411 and 412), a charging signal for charging the stylus pen (e.g., the stylus pen 201), after the signal having the second pattern is applied to the garage coil (e.g., the coils 411 and 412).

According to various embodiments, the at least one processor (e.g., the processor 120) is configured to discontinue applying the charging signal to the garage coil (e.g., the coils 411 and 412), based on the stylus pen (e.g., the stylus pen 201) being identified as fully charged.

According to various embodiments, the at least one processor (e.g., the processor 120) may be configured to control the communication module (e.g., the communication module 190) to receive a communication signal including charging information about a battery of the stylus pen (e.g., the stylus pen 201).

According to various embodiments, the at least one processor may be configured to apply, to the garage coil (e.g., the coils 411 and 412), a signal having a third pattern indicating that the stylus pen (e.g., the stylus pen 201) is located in the garage, based on the stylus pen (e.g., the stylus pen 201) being identified as inserted into the garage.

According to various embodiments, the at least one processor (e.g., the processor 120) may be configured to perform an operation based on the position of the stylus pen (e.g., the stylus pen 201) identified by the panel (e.g., the sensing panel 503), based on the stylus pen (e.g., the stylus pen 201) being identified as removed from the garage and located within a recognizable range of the panel (e.g., the sensing panel 503).

According to various embodiments, the at least one processor (e.g., the processor 120) may be configured to control the communication module (e.g., the communication module 190) to transmit, to the stylus pen (e.g., the stylus pen 201), the communication signal including the information for controlling the stylus pen (e.g., the stylus pen 201) or to receive another communication signal from the stylus pen (e.g., the stylus pen 201), based on the stylus pen (e.g., the stylus pen 201) being identified as removed from the garage and located outside a recognizable range of the panel (e.g., the sensing panel 503).

According to various embodiments, the at least one processor (e.g., the processor 120) may be configured to periodically apply a scan signal to the garage coil (e.g., the coils 411 and 412), and based on response signal corresponding to the scan signal being identified as detected, identify that the stylus pen (e.g., the stylus pen 201) is inserted into the garage.

According to various embodiments, a stylus pen (e.g., the stylus pen 201) may include a resonant circuit (e.g., the resonant circuit 287) including a coil and at least one capacitor, a communication module (e.g., the communication) circuit 290), and at least one control circuit (e.g., the processor 220), and the at least one control circuit (e.g., the processor 220) may be configured to perform a first operation corresponding to a result of an analysis of a signal having a pattern output through the resonant circuit, while the stylus pen (e.g., the stylus pen 201) is located in a garage of an electronic device (e.g., the electronic device 101), and perform a second operation corresponding to information included in a communication signal received through the communication module (e.g., the communication module 190), while the stylus pen (e.g., the stylus pen 201) is located outside the garage of the electronic device (e.g., the electronic device 101).

According to various embodiments, the stylus pen (e.g., the stylus pen 201) may further include a battery (e.g., the battery 289) and at least one rectifier (e.g., the rectifiers 431 and 435) that rectifies power output from the resonant circuit and transmits the rectified power to at least a part of the battery (e.g., the battery 289) or the at least one control circuit (e.g., the processor 220).

According to various embodiments, the at least one control circuit (e.g., the processor 220) may be configured to perform the first operation corresponding to a result of an analysis of the waveform of a voltage of power output from the resonant circuit (e.g., the resonance circuit 287).

According to various embodiments, the stylus pen (e.g., the stylus pen 201) may further include a switch that selectively connects between at least a part of the at least one rectifier and the battery, and the at least one control circuit (e.g., the processor 220) may be configured to control the switch to connect the at least part of the at least one rectifier to the battery, based on the result of the analysis of the signal being identified as commanding initiation of charging the stylus pen (e.g., the stylus pen 201).

According to various embodiments, the at least one control circuit (e.g., the processor 220) may be configured to control the switch not to connect the at least part of the at least one rectifier to the battery, based on the result of the analysis of the signal being identified as commanding termination of charging the stylus pen (e.g., the stylus pen 201).

According to various embodiments, the at least one control circuit (e.g., the processor 220) may be configured to transmit a signal instructing reset of the communication module (e.g., the communication module 290) to the communication module (e.g., the communication module 290), based on the result of the analysis of the signal being identified as commanding reset of the communication module (e.g., the communication module 290).

According to various embodiments, the at least one control circuit (e.g., the processor 220) may be configured to identify that the stylus pen (e.g., the stylus pen 201) is located in the garage of the electronic device (e.g., the electronic device 101) based on the result of the analysis of the signal.

According to various embodiments, the at least one control circuit (e.g., the processor 220) may be configured to generate a response signal corresponding to a detection signal based on the electronic device (e.g., the electronic device 101) being identified to correspond to the detection signal as a result of the analysis of the signal.

According to various embodiments, a method of operating an electronic device (e.g., the electronic device 101) including a panel configured (e.g., the sensing panel 503) to identify a position of a stylus pen (e.g., the stylus pen 201), a communication module (e.g., the communication module 190) configured to transmit and receive communication signals to and from the stylus pen (e.g., the stylus pen 201), and at least one garage coil (e.g., the coils 411 and 412) disposed at a position corresponding to a position of a garage in which the stylus pen (e.g., the stylus pen 201) is accommodatable may include, based on the stylus pen (e.g., the stylus pen 201) being identified as inserted into the garage, applying, based on a first communication method, a signal having a pattern for controlling the stylus pen (e.g., the stylus pen 201) to the garage coil (e.g., the coils 411 and 412), and based on the stylus pen (e.g., the stylus pen 201) being identified as removed from the garage, controlling the communication module (e.g., the communication module 190) to transmit, based on a second communication method, a communication signal including information for controlling the stylus pen (e.g., the stylus pen 201) to the stylus pen (e.g., the stylus pen 201).

According to various embodiments, the applying of a signal having a pattern for controlling the stylus pen (e.g., the stylus pen 201) to the garage coil (e.g., the coils 411 and 412) may include applying, to the garage coil (e.g., the coils 411 and 412), a signal instructing initiation of changing the stylus pen (e.g., the stylus pen 201), based on the stylus pen (e.g., the stylus pen 201) being identified as inserted into the garage. The electronic device according to various embodiments may be one of various types of electronic devices. The electronic devices may include, for example, a computer device, a portable communication device (e.g., a smartphone), a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B," "A, B, or C", "at least one of A, B, and C," and "at least one of A, B, or C" may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with" or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., a master device or task performing device). For example, a processor of the machine (e.g., the master device or task performing device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term 'non-transitory' simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added.

Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a panel configured to identify a position of a stylus pen,
a communication module configured to transmit and receive communication signals to and from the stylus pen,
at least one garage coil disposed at a position corresponding to a position of a garage in which the stylus pen is accommodatable, and
at least one processor,
wherein the at least one processor is configured to:
based on the stylus pen being identified as inserted into the garage, apply, based on a first communication method, a signal having a pattern for controlling the stylus pen to the garage coil, and
based on the stylus pen being identified as removed from the garage, control the communication module to transmit, based on a second communication method, a communication signal including information controlling the stylus pen to the stylus pen,
wherein the at least one processor is configured to apply, to the garage coil, a signal having a first pattern instructing reset of a communication module of the stylus pen, based on identifying that reset of the stylus pen is required.

2. The electronic device of claim 1, wherein the at least one processor is configured to apply, to the garage coil, a signal having a second pattern instructing initiation of charging the stylus pen, based on the stylus pen being identified as inserted into the garage.

3. The electronic device of claim 2, wherein the at least one processor is configured to apply, to the garage coil, a charging signal for charging the stylus pen, after the signal having the second pattern is applied to the garage coil.

4. The electronic device of claim 3, wherein the at least one processor is configured to discontinue the application of the charging signal to the garage coil, based on the stylus pen being identified as fully charged.

5. The electronic device of claim 3, wherein the at least one processor is configured to control the communication module to receive a communication signal including charging information about a battery of the stylus pen.

6. The electronic device of claim 1, wherein the at least one processor is configured to apply, to the garage coil, a signal having a third pattern indicating that the stylus pen is located in the garage, based on the stylus pen being identified as inserted into the garage.

7. The electronic device of claim 1, wherein the at least one processor is configured to perform an operation based on the position of the stylus pen identified by the panel, based on the stylus pen being identified as removed from the garage and located within a recognizable range of the panel.

8. The electronic device of claim 1, wherein the at least one processor is configured to control the communication module to transmit, to the stylus pen, the communication signal including the information for controlling the stylus pen or to receive another communication signal from the stylus pen, based on the stylus pen being identified as removed from the garage and located outside a recognizable range of the panel.

9. The electronic device of claim 1, wherein the at least one processor is configured to:
periodically apply a scan signal to the garage coil, and
based on a response signal corresponding to the scan signal being identified as detected, identify that the stylus pen is inserted into the garage.

10. A method of operating an electronic device including a panel configured to identify a position of a stylus pen, a communication module configured to transmit and receive communication signals to and from the stylus pen, and at least one garage coil disposed at a position corresponding to a position of a garage in which the stylus pen is accommodatable, the method comprising:
based on the stylus pen being identified as inserted into the garage, applying, based on a first communication method, a signal having a pattern for controlling the stylus pen to the garage coil; and
based on the stylus pen being identified as removed from the garage, controlling the communication module to transmit, based on a second communication method, a communication signal including information controlling the stylus pen to the stylus pen,
wherein the application of the signal having the pattern for controlling the stylus pen to the garage coil comprises applying, to the garage coil, the signal having the first pattern instructing reset of a communication module of the stylus pen, based on identifying that reset of the stylus pen is required.

11. The method of claim 10, wherein the application of the signal having the pattern for controlling the stylus pen to the garage coil comprises applying, to the garage coil, the signal having the second pattern instructing initiation of charging the stylus pen, based on the stylus pen being identified as inserted into the garage.

12. The method of claim 11, further comprising applying, to the garage coil, a charging signal for charging the stylus pen, after the signal having the second pattern is applied to the garage coil.

13. The method of claim 12, further comprising discontinuing the application of the charging signal to the garage coil, based on the stylus pen being identified as fully charged.

* * * * *